(12) United States Patent
Wang et al.

(10) Patent No.: US 12,457,585 B2
(45) Date of Patent: Oct. 28, 2025

(54) NETWORK INDICATION TO CONTROL SIDELINK BEAM SELECTION

(71) Applicant: QUALCOMM Incorporated, San Diego, CA (US)

(72) Inventors: Hua Wang, Basking Ridge, NJ (US); Sony Akkarakaran, Poway, CA (US); Tianyang Bai, Somerville, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 546 days.

(21) Appl. No.: 17/814,689

(22) Filed: Jul. 25, 2022

(65) Prior Publication Data

US 2024/0031991 A1    Jan. 25, 2024

(51) Int. Cl.
*H04W 72/02* (2009.01)
*H04W 72/04* (2023.01)
*H04W 72/044* (2023.01)
*H04W 72/14* (2009.01)
*H04W 72/23* (2023.01)
*H04W 80/02* (2009.01)

(52) U.S. Cl.
CPC ......... *H04W 72/02* (2013.01); *H04W 72/046* (2013.01); *H04W 72/23* (2023.01); *H04W 80/02* (2013.01)

(58) Field of Classification Search
CPC ... H04W 72/23; H04W 72/02; H04W 72/046; H04W 80/02; H04B 7/06954
See application file for complete search history.

(56) References Cited

U.S. PATENT DOCUMENTS

| | | | |
|---|---|---|---|
| 12,069,646 B2* | 8/2024 | Park | H04L 1/1861 |
| 2021/0153176 A1* | 5/2021 | Lee | H04W 4/40 |
| 2022/0046458 A1* | 2/2022 | Zhu | H04L 5/0048 |
| 2022/0095240 A1* | 3/2022 | Ying | H04B 17/336 |
| 2022/0174774 A1* | 6/2022 | Tseng | H04W 76/34 |
| 2022/0272662 A1* | 8/2022 | Kim | H04W 72/23 |
| 2022/0386355 A1* | 12/2022 | Yi | H04W 72/569 |
| 2023/0361955 A1* | 11/2023 | Ganesan | H04B 7/06966 |
| 2024/0063859 A1* | 2/2024 | Grieco | H04L 5/0051 |
| 2024/0187963 A1* | 6/2024 | Chen | H04W 40/246 |

* cited by examiner

*Primary Examiner* — Brian D Nguyen
(74) *Attorney, Agent, or Firm* — Kevin M. Donnelly; Harrity & Harrity, LLP

(57) ABSTRACT

Various aspects of the present disclosure generally relate to wireless communication. In some aspects, a transmitting user equipment (UE) may receive, from a network node, a sidelink grant that indicates a sidelink resource and indicates a set of sidelink beams associated with a sidelink communication using the sidelink resource. The UE may select, based at least in part on the set of sidelink beams indicated in the sidelink grant, a sidelink beam for the sidelink communication. The UE may transmit, via the selected sidelink beam, the sidelink communication to one or more receiving UEs using the sidelink resource indicated in the sidelink grant. Numerous other aspects are provided.

30 Claims, 12 Drawing Sheets

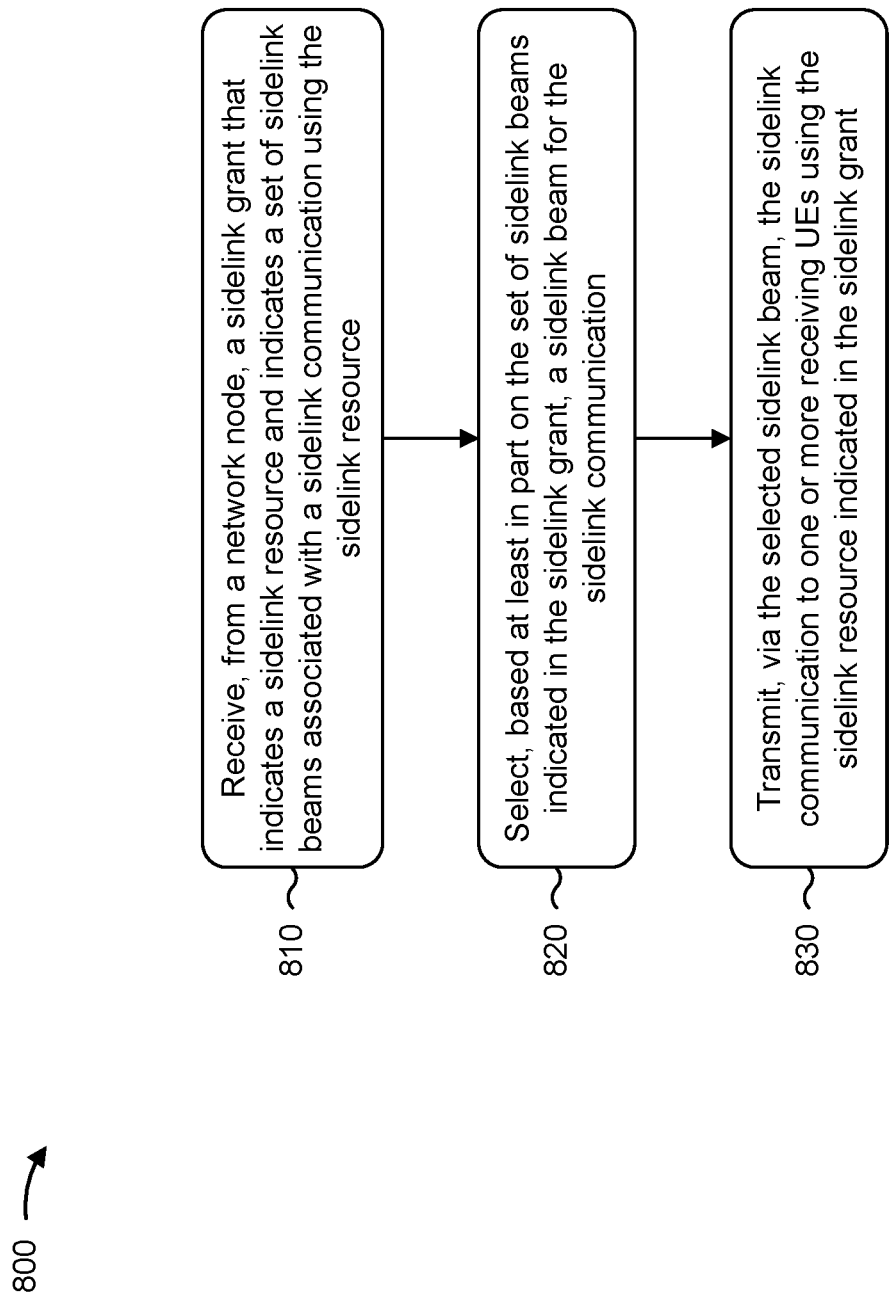

NETWORK INDICATION TO CONTROL SIDELINK BEAM SELECTION

FIELD OF THE DISCLOSURE

Aspects of the present disclosure generally relate to wireless communication and specifically, to techniques and apparatuses associated with a network indication to control sidelink beam selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In sidelink communication, where two or more UEs communicate directly using one or more sidelink channels (for example, without using a network node as an intermediary), the sidelink communication may be performed in a first transmission mode (for example, transmission mode 1) where resource selection or scheduling is performed by a network node or in a second transmission mode (for example, transmission mode 2) where resource selection or scheduling is performed by a transmitting UE. In cases where the sidelink communication is performed in the first transmission mode, the network node grants a sidelink resource to a transmitting UE, and the transmitting UE then uses the sidelink resource to transmit a sidelink communication to one or more receiving UEs. However, in cases where the sidelink transmission may potentially cause interference with access link (for example, downlink or uplink) communications in certain beam directions, the network node may be unable to indicate, to the transmitting UE, a particular sidelink beam that the transmitting UE is to use to mitigate the potential interference. For example, the network node may be unable to provide an exact beam indication because the network node may only have access to a rough estimate of a range of suitable beam directions (for example, because sidelink communication is often configured for one-to-many transmissions, where receiving UEs may be in different relative positions, or because the network node is unaware of the precise position of the receiving UE(s)). Furthermore, in cases where a network node operating in the first transmission mode grants a sidelink resource to a transmitting UE connected to multiple receiving UEs on respective sidelink channels, the transmitting UE can choose on which of the multiple sidelinks to use the granted sidelink resource. In such cases, an exact beam indication by the network node would be inappropriate, because the network node could potentially indicate a sidelink beam that is steered in a beam direction other than a beam direction of the receiving UE(s) intended to receive the sidelink transmission. Accordingly, existing sidelink scheduling techniques suffer from drawbacks that prevent network nodes from having the ability to control sidelink beam selection (for example, to mitigate interference with access link communications).

SUMMARY

Some aspects described herein relate to a transmitting user equipment (UE) for wireless communication. The transmitting UE may include at least one memory and at least one processor communicatively coupled with the at least one memory. The at least one processor may be configured to cause the transmitting UE to receive, from a network node, a sidelink grant that indicates a sidelink resource and indicates a set of sidelink beams associated with a sidelink communication using the sidelink resource. The at least one processor may be configured to cause the transmitting UE to select, based at least in part on the set of sidelink beams indicated in the sidelink grant, a sidelink beam for the sidelink communication. The at least one processor may be configured to cause the transmitting UE to transmit, via the selected sidelink beam, the sidelink communication to one or more receiving UEs using the sidelink resource indicated in the sidelink grant.

Some aspects described herein relate to a network node for wireless communication. The network node may include at least one memory and at least one processor communicatively coupled with the at least one memory. The at least one processor may be configured to cause the network node to determine a sidelink resource and a set of sidelink beams associated with a sidelink communication using the sidelink resource. The at least one processor may be configured to cause the network node to transmit, to a UE, a sidelink grant that indicates the sidelink resource and indicates the set of sidelink beams associated with the sidelink communication, wherein the set of sidelink beams indicated in the sidelink grant controls selection of a sidelink beam used to transmit the sidelink communication.

Some aspects described herein relate to a method of wireless communication performed by a transmitting UE. The method may include receiving, from a network node, a sidelink grant that indicates a sidelink resource and indicates a set of sidelink beams associated with a sidelink communication using the sidelink resource. The method may include selecting, based at least in part on the set of sidelink beams indicated in the sidelink grant, a sidelink beam for the sidelink communication. The method may include transmitting, via the selected sidelink beam, the sidelink communication to one or more receiving UEs using the sidelink resource indicated in the sidelink grant.

Some aspects described herein relate to a method of wireless communication performed by a network node. The method may include determining a sidelink resource and a set of sidelink beams associated with a sidelink communication using the sidelink resource. The method may include transmitting, to a UE, a sidelink grant that indicates the sidelink resource and indicates the set of sidelink beams associated with the sidelink communication, wherein the set of sidelink beams indicated in the sidelink grant controls selection of a sidelink beam used to transmit the sidelink communication.

Some aspects described herein relate to a non-transitory computer-readable medium that stores a set of instructions for wireless communication by a transmitting UE. The set of instructions, when executed by one or more processors of the transmitting UE, may cause the transmitting UE to receive, from a network node, a sidelink grant that indicates a sidelink resource and indicates a set of sidelink beams associated with a sidelink communication using the sidelink resource. The set of instructions, when executed by one or more processors of the transmitting UE, may cause the transmitting UE to select, based at least in part on the set of sidelink beams indicated in the sidelink grant, a sidelink beam for the sidelink communication. The set of instructions, when executed by one or more processors of the transmitting UE, may cause the transmitting UE to transmit, via the selected sidelink beam, the sidelink communication to one or more receiving UEs using the sidelink resource indicated in the sidelink grant.

Some aspects described herein relate to a non-transitory computer-readable medium that stores a set of instructions for wireless communication by a network node. The set of instructions, when executed by one or more processors of the network node, may cause the network node to determine a sidelink resource and a set of sidelink beams associated with a sidelink communication using the sidelink resource. The set of instructions, when executed by one or more processors of the network node, may cause the network node to transmit, to a UE, a sidelink grant that indicates the sidelink resource and indicates the set of sidelink beams associated with the sidelink communication, wherein the set of sidelink beams indicated in the sidelink grant controls selection of a sidelink beam used to transmit the sidelink communication.

Some aspects described herein relate to an apparatus for wireless communication. The apparatus may include means for receiving, from a network node, a sidelink grant that indicates a sidelink resource and indicates a set of sidelink beams associated with a sidelink communication using the sidelink resource. The apparatus may include means for selecting, based at least in part on the set of sidelink beams indicated in the sidelink grant, a sidelink beam for the sidelink communication. The apparatus may include means for transmitting, via the selected sidelink beam, the sidelink communication to one or more receiving UEs using the sidelink resource indicated in the sidelink grant.

Some aspects described herein relate to an apparatus for wireless communication. The apparatus may include means for determining a sidelink resource and a set of sidelink beams associated with a sidelink communication using the sidelink resource. The apparatus may include means for transmitting, to a UE, a sidelink grant that indicates the sidelink resource and indicates the set of sidelink beams associated with the sidelink communication, wherein the set of sidelink beams indicated in the sidelink grant controls selection of a sidelink beam used to transmit the sidelink communication.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 8 is a flowchart illustrating an example process performed, for example, by a UE in accordance with the present disclosure.

DETAILED DESCRIPTION

Figure 1:
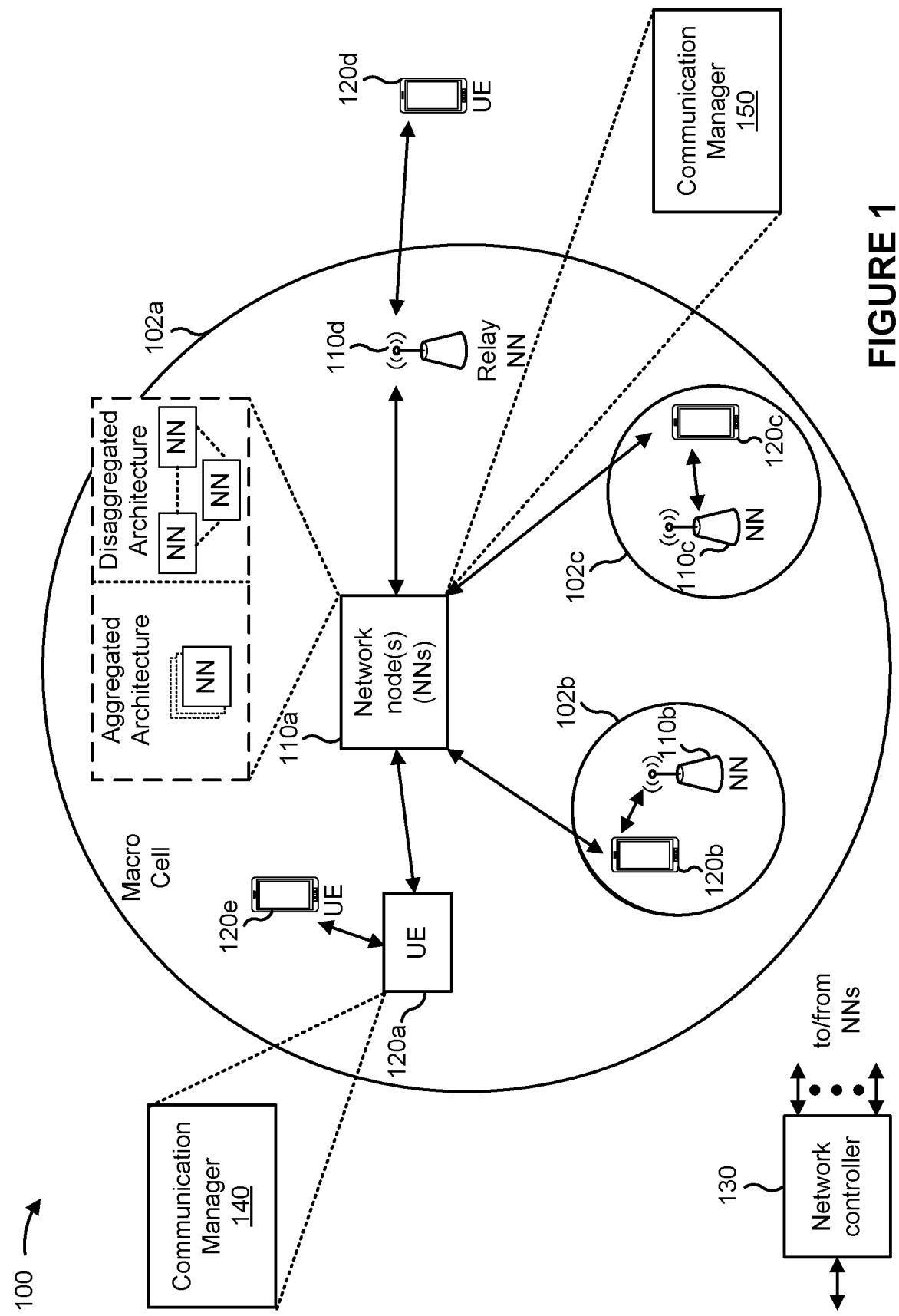
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to a network indication to control sidelink beam selection by a transmitting user equipment (UE) in a sidelink transmission mode where a network node performs resource selection or scheduling. Some aspects more specifically relate to a network node transmitting, to a transmitting UE, a downlink control information (DCI) message carrying a sidelink grant that indicates a sidelink resource that the transmitting UE can use to transmit a sidelink communication in addition to a set of sidelink beams associated with the sidelink communication. For example, the set of sidelink beams indicated in the sidelink grant may correspond to a set of sidelink beams that are eligible to be selected by the transmitting UE as a sidelink beam used to transmit the sidelink communication, or the indicated set of sidelink beams may correspond to a set of sidelink beams that are ineligible to be selected as the sidelink beam. Some aspects further relate to semi-static (for example, radio resource control (RRC)) signaling that can be used to configure sidelink neighborhood beam information that defines a set of neighboring (for example, adjacent) sidelink beams associated with one or more transmission configuration indication (TCI) states and to dynamic (for example, medium access control control element (MAC-CE) or DCI) signaling formats that can be used to enable the network node to indicate the set of beams in the sidelink grant.

Particular aspects of the subject matter described in this disclosure can be implemented to realize one or more of the following potential advantages. In some examples, the described techniques can be used to enable a network node to indicate a set of sidelink beams such that the network node can limit a sidelink transmission to a certain range of beam directions and thereby mitigate or otherwise control potential interference that a sidelink transmission may cause in a certain direction. For example, the network node may determine a set of sidelink beams that cause an acceptable level of interference at the network node (for example, a level of interference satisfying a threshold) or a set of sidelink beams that cause unacceptable interference at the network node (for example, a level of interference failing to satisfy the threshold), and may indicate a set of eligible or ineligible sidelink beams to the transmitting UE to mitigate or otherwise control the level of interference caused by the sidelink transmission of the transmitting UE. Furthermore, the beam indication provided to the transmitting UE may be configured such that the transmitting UE can select a sidelink beam from multiple candidate sidelink beams that are associated with acceptable interference levels (for example, any sidelink beam included in a set of sidelink beams that the network node indicates are eligible to be selected as the sidelink beam, or any sidelink beam that is not included in a set of sidelink beams that the network node indicates are ineligible to be selected as the sidelink beam). In this way, the network node has the ability to exert partial control over the sidelink beam that the transmitting UE uses for the sidelink transmission, and the transmitting UE has flexibility to select a specific sidelink beam to use to connect to a receiving UE.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a UE 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a network node 110, a sidelink grant that indicates a sidelink resource and indicates a set of sidelink beams associated with a sidelink communication using the sidelink resource; select, based at least in part on the set of sidelink beams indicated in the sidelink grant, a sidelink beam for the sidelink communication; and transmit, via the selected sidelink beam, the sidelink communication to one or more receiving UEs 120 using the sidelink resource indicated in the sidelink grant. Additionally or alternatively, the communication manager 140 may perform one or more other operations described herein.

In some aspects, the network node 110 may include a communication manager 150. As described in more detail elsewhere herein, the communication manager 150 may determine a sidelink resource and a set of sidelink beams associated with a sidelink communication using the sidelink resource; and transmit, to a UE 120, a sidelink grant that indicates the sidelink resource and indicates the set of sidelink beams associated with the sidelink communication, wherein the set of sidelink beams indicated in the sidelink grant controls selection of a sidelink beam used to transmit the sidelink communication. Additionally or alternatively, the communication manager 150 may perform one or more other operations described herein.

Figure 2:
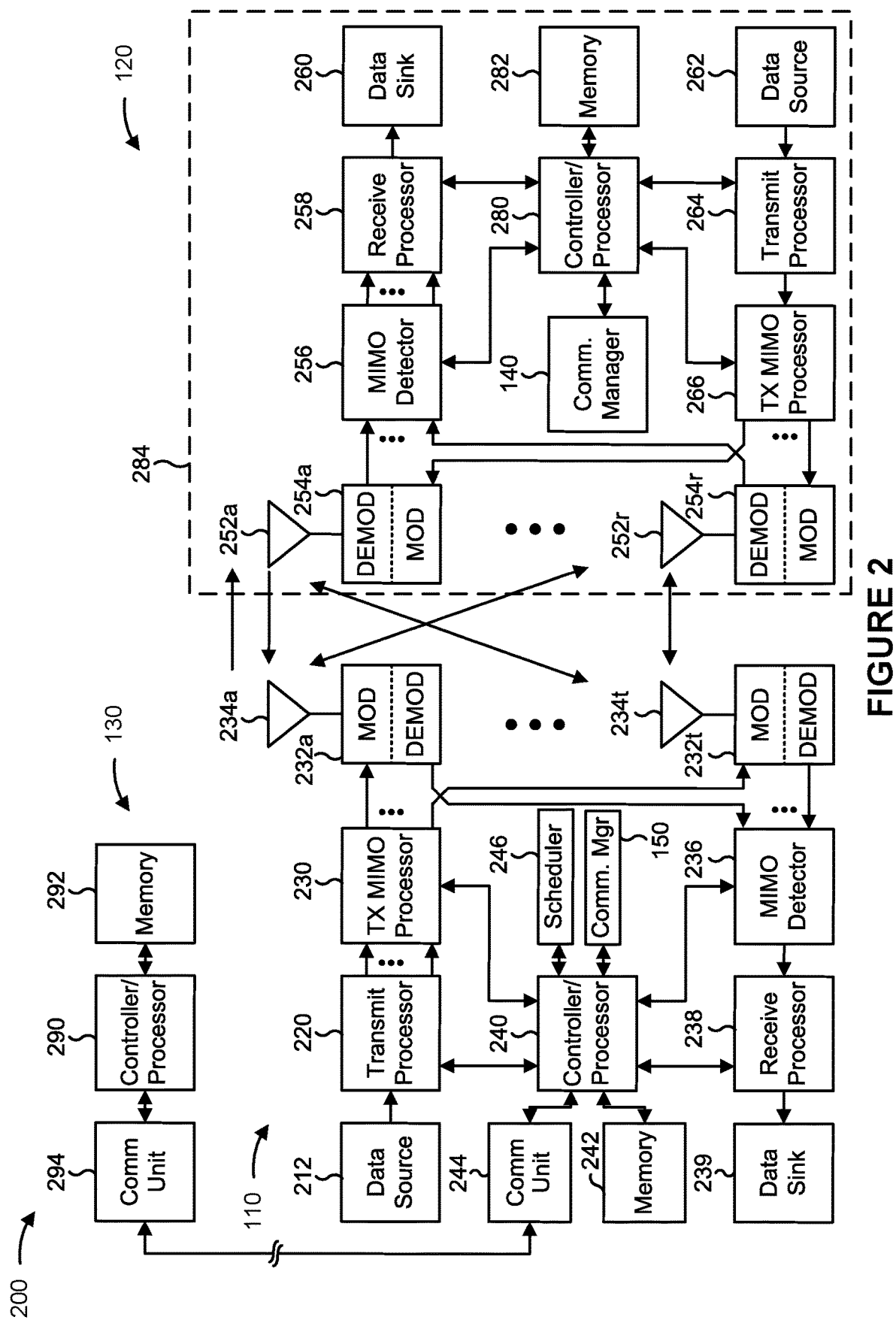
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MC S(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with a network indication to control sidelink beam selection, as described in more detail elsewhere herein. For example, the controller/processor 240 of the network node 110, the controller/processor 280 of the UE 120, or any other component(s) of FIG. 2 may perform or direct operations of, for example, process 800 of FIG. 8, process 900 of FIG. 9, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 800 of FIG. 8, process 900 of FIG. 9, or other processes as described herein. In some examples, executing instructions may include running the instructions, converting the instructions, compiling the instructions, or interpreting the instructions, among other examples.

In some aspects, a transmitting UE 120 includes means for receiving, from a network node 110, a sidelink grant that indicates a sidelink resource and indicates a set of sidelink beams associated with a sidelink communication using the sidelink resource; means for selecting, based at least in part on the set of sidelink beams indicated in the sidelink grant, a sidelink beam for the sidelink communication; or means for transmitting, via the selected sidelink beam, the sidelink communication to one or more receiving UEs 120 using the sidelink resource indicated in the sidelink grant. The means for the transmitting UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node 110 includes means for determining a sidelink resource and a set of sidelink beams associated with a sidelink communication using the sidelink resource; or means for transmitting, to a UE 120, a sidelink grant that indicates the sidelink resource and indicates the set of sidelink beams associated with the sidelink communication, wherein the set of sidelink beams indicated in the sidelink grant controls selection of a sidelink beam used to transmit the sidelink communication. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
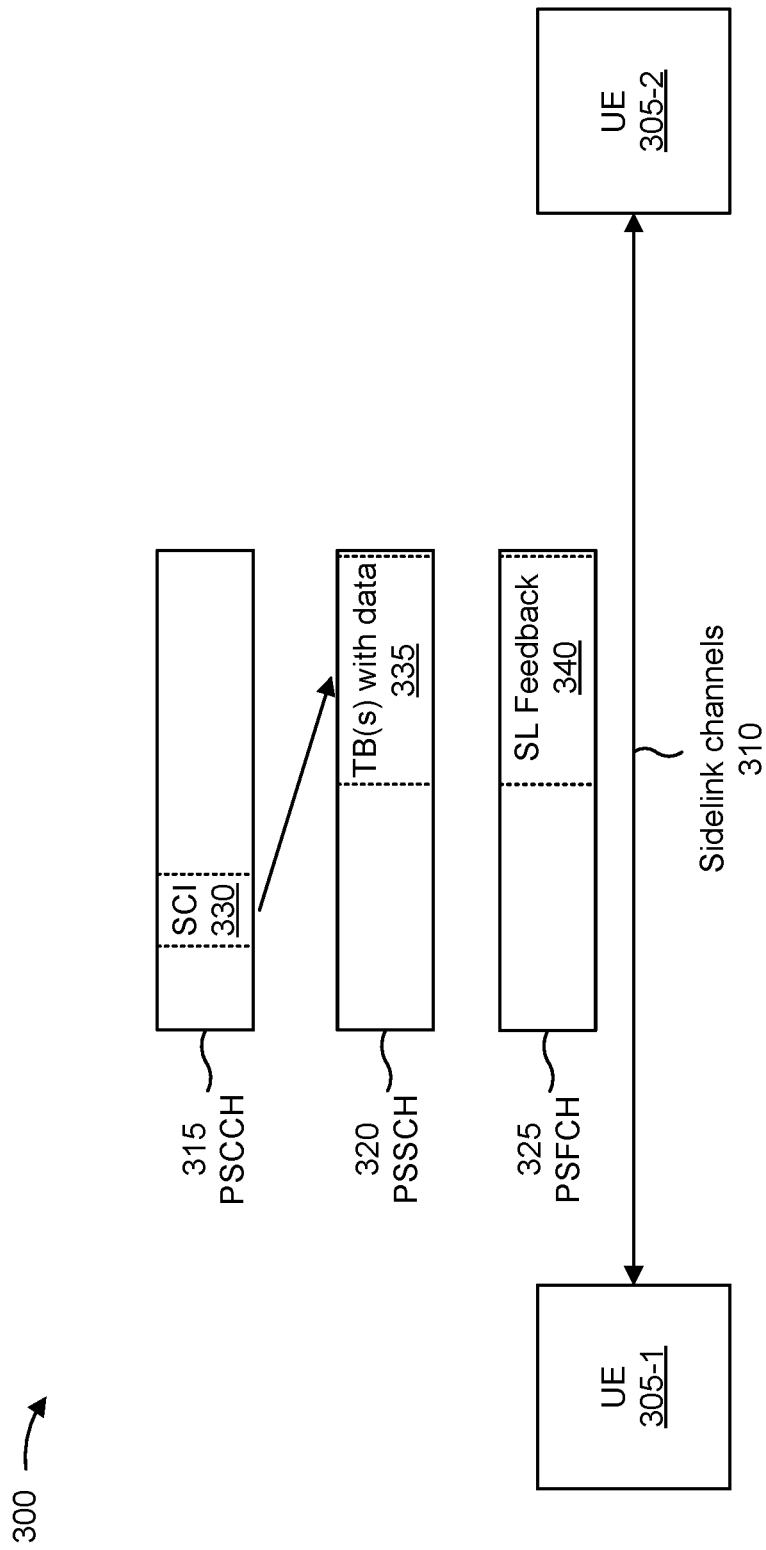
FIG. 3 is a diagram illustrating an example of sidelink communications in accordance with the present disclosure.

FIG. 3 is a diagram illustrating an example 300 of sidelink communications in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (for example, which may include V2V communications, V2I communications, or V2P communications) or mesh networking. In some aspects, the UEs 305 (for example, UE 305-1 or UE 305-2) may correspond to one or more other UEs described elsewhere herein, such as UE 120. In some aspects, the one or more sidelink channels 310 may use a PC5 interface or may operate in a high frequency band (for example, the 5.9 GHz band). Additionally or alternatively, the UEs 305 may synchronize timing of transmission time intervals (TTIs) (for example, frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, or a physical sidelink feedback channel (PSFCH) 325. The PSCCH 315 may be used to communicate control information, similar to a physical downlink control channel (PDCCH) or a physical uplink control channel (PUCCH) used for cellular communications with a network node 110 via an access link or an access channel.

The PSSCH 320 may be used to communicate data, similar to a physical downlink shared channel (PDSCH) or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (for example, time resources, frequency resources, or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (for example, acknowledgement or negative acknowledgement (ACK/NACK) information), transmit power control (TPC), or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (for example, time resources, frequency resources, or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, or an MCS. The SCI-2 may include information associated with data transmissions on the PSSCH 320, such as a HARQ process ID, a new data indicator (NDI), a source identifier, a destination identifier, or a channel state information (CSI) report trigger.

In some aspects, the one or more sidelink channels 310 may use resource pools. For example, a scheduling assignment (for example, included in SCI 330) may be transmitted in sub-channels using specific resource blocks (RBs) across time. In some aspects, data transmissions (for example, on the PSSCH 320) associated with a scheduling assignment may occupy adjacent RBs in the same subframe as the scheduling assignment (for example, using frequency division multiplexing). In some aspects, a scheduling assignment and associated data transmissions are not transmitted on adjacent RBs.

In some aspects, a UE 305 may operate using a sidelink transmission mode (for example, transmission mode 1) where resource selection or scheduling is performed by a network node 110 (for example, a base station, a CU, or a DU). For example, the UE 305 may receive a grant (for example, in DCI or in an RRC message, such as for configured grants) from the network node 110 (for example, directly or via one or more network nodes) for sidelink channel access or scheduling. In some aspects, a UE 305 may operate using a transmission mode (for example, transmission mode 2) where resource selection or scheduling is performed by the UE 305 (for example, rather than a network node 110). In some aspects, the UE 305 may perform resource selection or scheduling by sensing channel availability for transmissions. For example, the UE 305 may measure an RSSI parameter (for example, a sidelink-RSSI (S-RSSI) parameter) associated with various sidelink channels, may measure an RSRP parameter (for example, a PSSCH-RSRP parameter) associated with various sidelink channels, or may measure an RSRQ parameter (for example, a PSSCH-RSRQ parameter) associated with various sidelink channels, and may select a channel for transmission of a sidelink communication based at least in part on the measurement(s).

Additionally or alternatively, the UE 305 may perform resource selection or scheduling using SCI 330 received in the PSCCH 315, which may indicate occupied resources or channel parameters. Additionally or alternatively, the UE 305 may perform resource selection or scheduling by determining a channel busy ratio (CBR) associated with various sidelink channels, which may be used for rate control (for example, by indicating a maximum number of resource blocks that the UE 305 can use for a particular set of subframes).

In the transmission mode where resource selection or scheduling is performed by a UE 305, the UE 305 may generate sidelink grants, and may transmit the grants in SCI 330. A sidelink grant may indicate, for example, one or more parameters (for example, transmission parameters) to be used for an upcoming sidelink transmission, such as one or more resource blocks to be used for the upcoming sidelink transmission on the PSSCH 320 (for example, for TBs 335), one or more subframes to be used for the upcoming sidelink transmission, or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally or alternatively, the UE 305 may generate a sidelink grant for event-driven scheduling, such as for an on-demand sidelink message.

Figure 4:
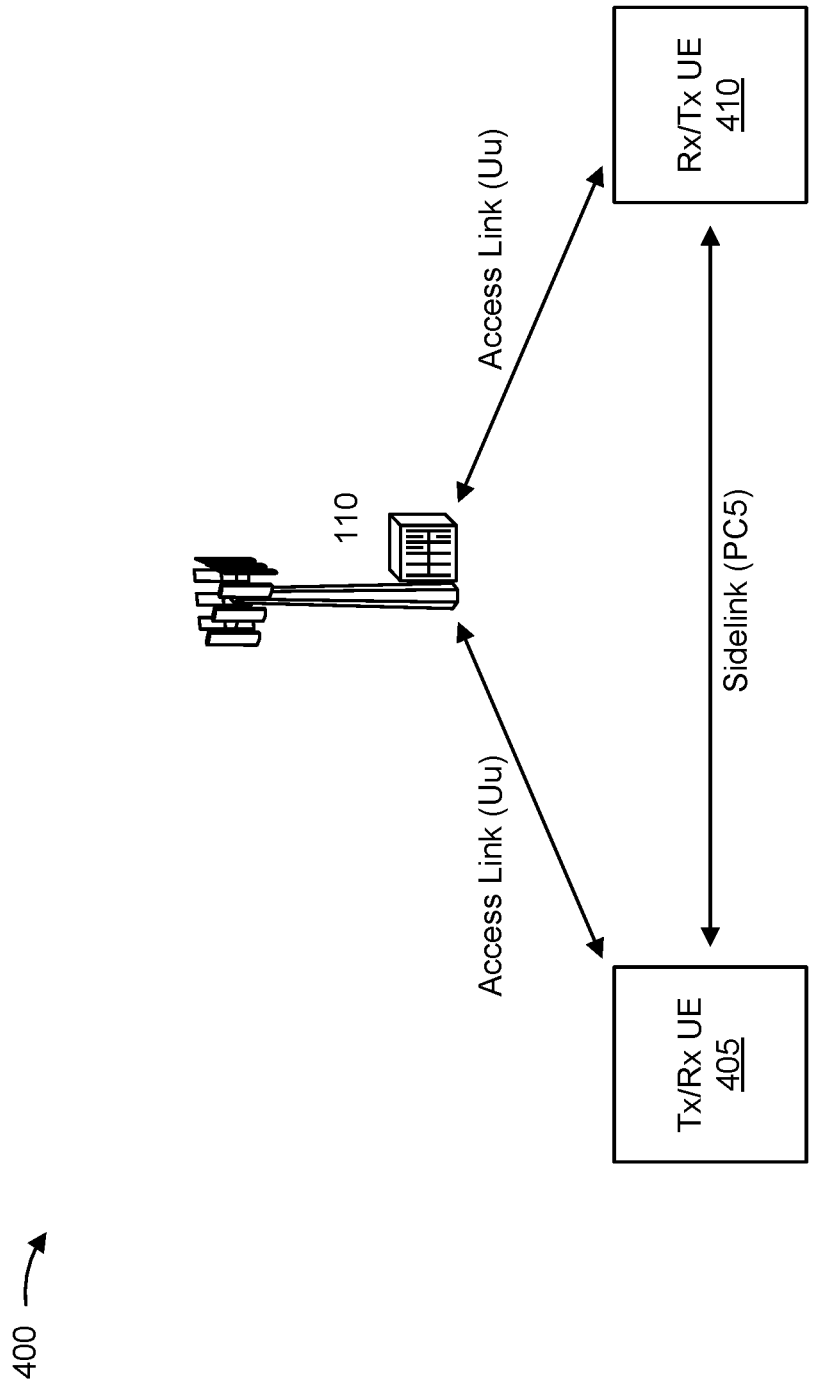
FIG. 4 is a diagram illustrating an example of access link communications and sidelink communications in accordance with the present disclosure.

FIG. 4 is a diagram illustrating an example 400 of access link communications and sidelink communications in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a network node 110 may communicate with the Tx/Rx UE 405 via a first access link (for example, in transmission mode 1, where the network node 110 indicates transmission resources to be used by the Tx/Rx UE 405). Additionally or alternatively, in some sidelink modes (for example, transmission mode 1), the network node 110 may communicate with the Rx/Tx UE 410 via a second access link. The Tx/Rx UE 405 or the Rx/Tx UE 410 may correspond to one or more UEs described elsewhere herein, such as the UE 120 of FIG. 1. Thus, a direct link between UEs 120 (for example, via a PC5 interface) may be referred to as a sidelink, and a direct link between a network node 110 and a UE 120 (for example, via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110). For example, as described in further detail herein, a downlink communication sent from a network node 110 to a UE 120 (for example, the Tx/Rx UE 405 or the Rx/Tx UE 410) may include a network indication to control selection of a sidelink beam that the UE 120 is to use for sidelink communications (for example, on a PSCCH, PSSCH, or PSFCH).

Figure 5:
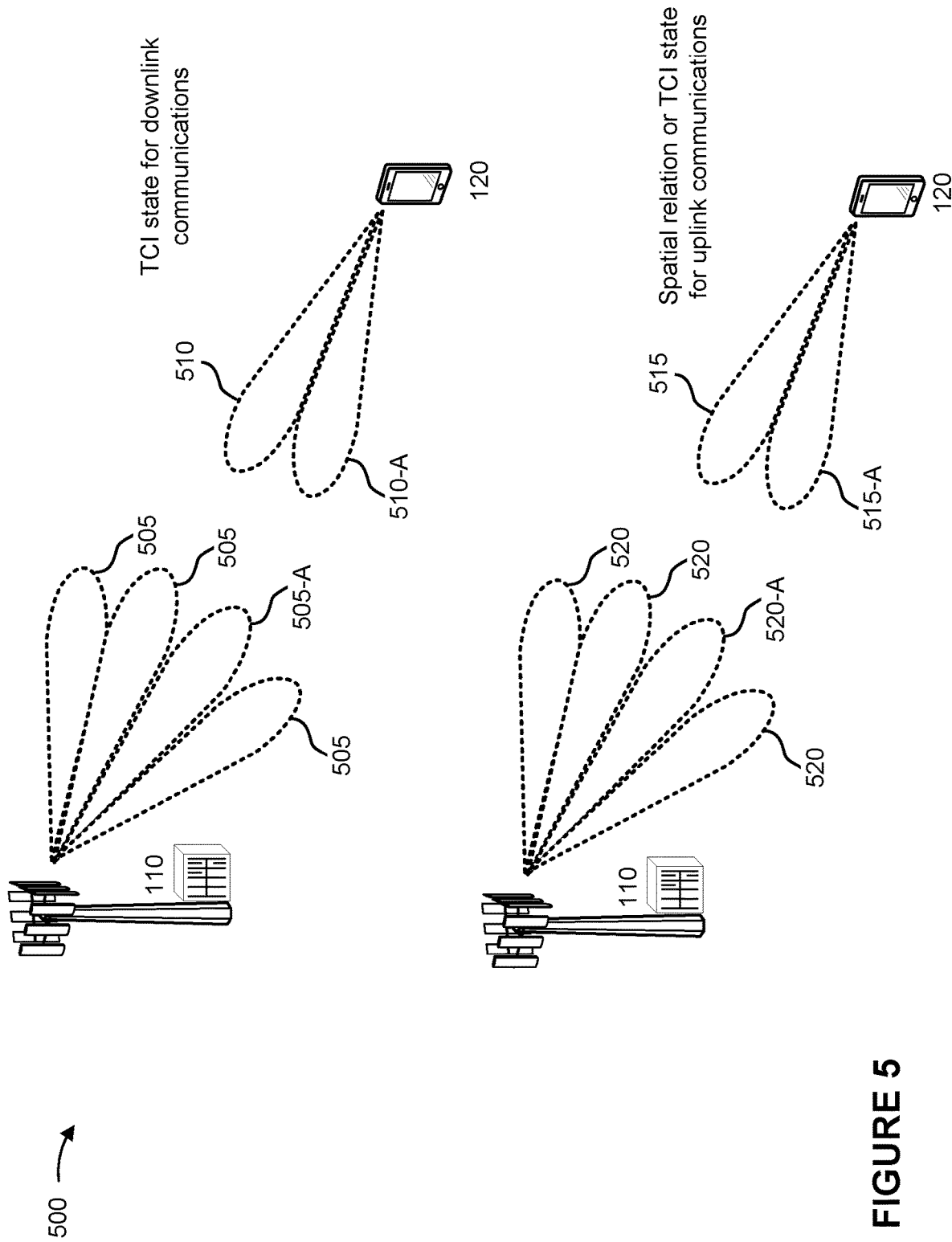
FIG. 5 is a diagram illustrating an example of using beams for access link communications between a network node and a UE in accordance with the present disclosure.

FIG. 5 is a diagram illustrating an example 500 of using beams for access link communications between a network node 110 and a UE 120 in accordance with the present disclosure. As shown in FIG. 5, a network node 110 and a UE 120 may communicate with one another in a wireless network (for example, wireless network 100).

The network node 110 may transmit to UEs 120 located within a coverage area of the network node 110. The network node 110 and the UE 120 may be configured for beamformed communications, where the network node 110 may transmit in the direction of the UE 120 using a directional downlink transmit beam, and the UE 120 may receive the transmission using a directional downlink receive beam. Each downlink transmit beam may have an associated beam ID, beam direction, or beam symbols, among other examples. The network node 110 may transmit downlink communications via one or more downlink transmit beams 505.

The UE 120 may attempt to receive downlink transmissions via one or more downlink receive beams 510, which may be configured using different beamforming parameters at receive circuitry of the UE 120. The UE 120 may identify a particular downlink transmit beam 505, shown as downlink transmit beam 505-A, and a particular downlink receive beam 510, shown as downlink receive beam 510-A, that provide relatively favorable performance (for example, that have a best channel quality of the different measured combinations of downlink transmit beams 505 and downlink receive beams 510). In some examples, the UE 120 may transmit an indication of which downlink transmit beam 505 is identified by the UE 120 as a preferred downlink transmit beam, which the network node 110 may select for transmissions to the UE 120. The UE 120 may thus attain and maintain a beam pair link (BPL) with the network node 110 for downlink communications (for example, a combination of the downlink transmit beam 505-A and the downlink receive beam 510-A), which may be further refined and maintained in accordance with one or more established beam refinement procedures.

A downlink beam, such as a downlink transmit beam 505 or a downlink receive beam 510, may be associated with a TCI state. A TCI state may indicate a directionality or a characteristic of the downlink beam, such as one or more quasi co-location (QCL) properties of the downlink beam. A QCL property may include, for example, a Doppler shift, a Doppler spread, an average delay, a delay spread, or spatial receive parameters, among other examples. In some examples, each downlink transmit beam 505 may be associated with a synchronization signal block (SSB), and the UE 120 may indicate a preferred downlink transmit beam 505 by transmitting uplink transmissions in resources of the SSB that are associated with the preferred downlink transmit beam 505. A particular SSB may have an associated TCI state (for example, for an antenna port or for beamforming). The network node 110 may, in some examples, indicate a downlink downlink transmit beam 505 based at least in part on antenna port QCL properties that may be indicated by the TCI state. A TCI state may be associated with one downlink reference signal set (for example, an SSB and an aperiodic, periodic, or semi-persistent CSI-reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters (for example, QCL type D), the QCL type may correspond to analog receive beamforming parameters of a downlink receive beam 510 at the UE 120. Thus, the UE 120 may select a corresponding downlink receive beam 510 from a set of BPLs based at least in part on the network node 110 indicating a downlink transmit beam 505 via a TCI indication.

The network node 110 may maintain a set of activated TCI states for downlink shared channel transmissions and a set of activated TCI states for downlink control channel transmissions. The set of activated TCI states for downlink shared channel transmissions may correspond to beams that the network node 110 uses for downlink transmission on a PDSCH. The set of activated TCI states for downlink control channel communications may correspond to beams that the network node 110 may use for downlink transmission on a PDCCH or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as an RRC message (for example, an RRCReconfiguration message).

Similarly, for uplink communications, the UE 120 may transmit in the direction of the network node 110 using a directional uplink transmit beam, and the network node 110 may receive the transmission using a directional uplink receive beam. Each uplink transmit beam may have an associated beam ID, beam direction, or beam symbols, among other examples. The UE 120 may transmit uplink communications via one or more uplink transmit beams 515.

The network node 110 may receive uplink transmissions via one or more uplink receive beams 520. The network node 110 may identify a particular uplink transmit beam 515, shown as uplink transmit beam 515-A, and a particular uplink receive beam 520, shown as uplink receive beam 520-A, that provide relatively favorable performance (for example, that have a best channel quality of the different measured combinations of uplink transmit beams 515 and uplink receive beams 520). In some examples, the network node 110 may transmit an indication of which uplink transmit beam 515 is identified by the network node 110 as a preferred uplink transmit beam, which the network node 110 may select for transmissions from the UE 120. The UE 120 and the network node 110 may thus attain and maintain a BPL for uplink communications (for example, a combination of the uplink transmit beam 515-A and the uplink receive beam 520-A), which may be further refined and maintained in accordance with one or more established beam refinement procedures. An uplink beam, such as a uplink transmit beam 515 or a uplink receive beam 520, may be associated with a spatial relation. A spatial relation may indicate a directionality or a characteristic of the uplink beam, similar to one or more QCL properties, as described above.

Additionally or alternatively, as shown in FIG. 5, the network node 110 and the UE 120 may communicate using a unified TCI framework, in which case the network node 110 may indicate a TCI state that the UE 120 is to use for beamformed uplink communications. For example, in a unified TCI framework, a joint TCI state (which may be referred to as a joint downlink and uplink TCI state) may be used to indicate a common beam that the UE 120 is to use for downlink communication and uplink communication. In this case, the joint downlink and uplink TCI state may include at least one source reference signal to provide a reference (or UE assumption) for determining QCL properties for a downlink communication or a spatial filter for uplink communication. For example, the joint downlink and uplink TCI state may be associated with one or more source reference signals that provide common QCL information for UE-dedicated PDSCH reception and one or more CORE-SETs in a component carrier, or one or more source reference signals that provide a reference to determine one or more common uplink transmission spatial filters for a PUSCH based on a dynamic grant or a configured grant or one or more dedicated PUCCH resources in a component carrier.

Additionally or alternatively, the unified TCI framework may support a separate downlink TCI state and a separate uplink TCI state to accommodate separate downlink and uplink beam indications (for example, in cases where a best uplink beam does not correspond to a best downlink beam, or vice versa). In such cases, each valid uplink TCI state configuration may contain a source reference signal to indicate an uplink transmit beam for a target uplink communication (for example, a target uplink reference signal or a target uplink channel). For example, the source reference signal may be an sounding reference signal (SRS), an SSB, or a CSI-RS, among other examples, and the target uplink communication may be a physical random access channel (PRACH), a PUCCH, a PUSCH, an SRS, or a DMRS (for example, for a PUCCH or a PUSCH), among other examples. In this way, supporting joint TCI states or separate downlink and uplink TCI states may enable a unified TCI framework for downlink and uplink communications or may enable the network node 110 to indicate various uplink QCL relationships (for example, Doppler shift, Doppler spread, average delay, or delay spread, among other examples) for uplink TCI communication.

Figure 6:
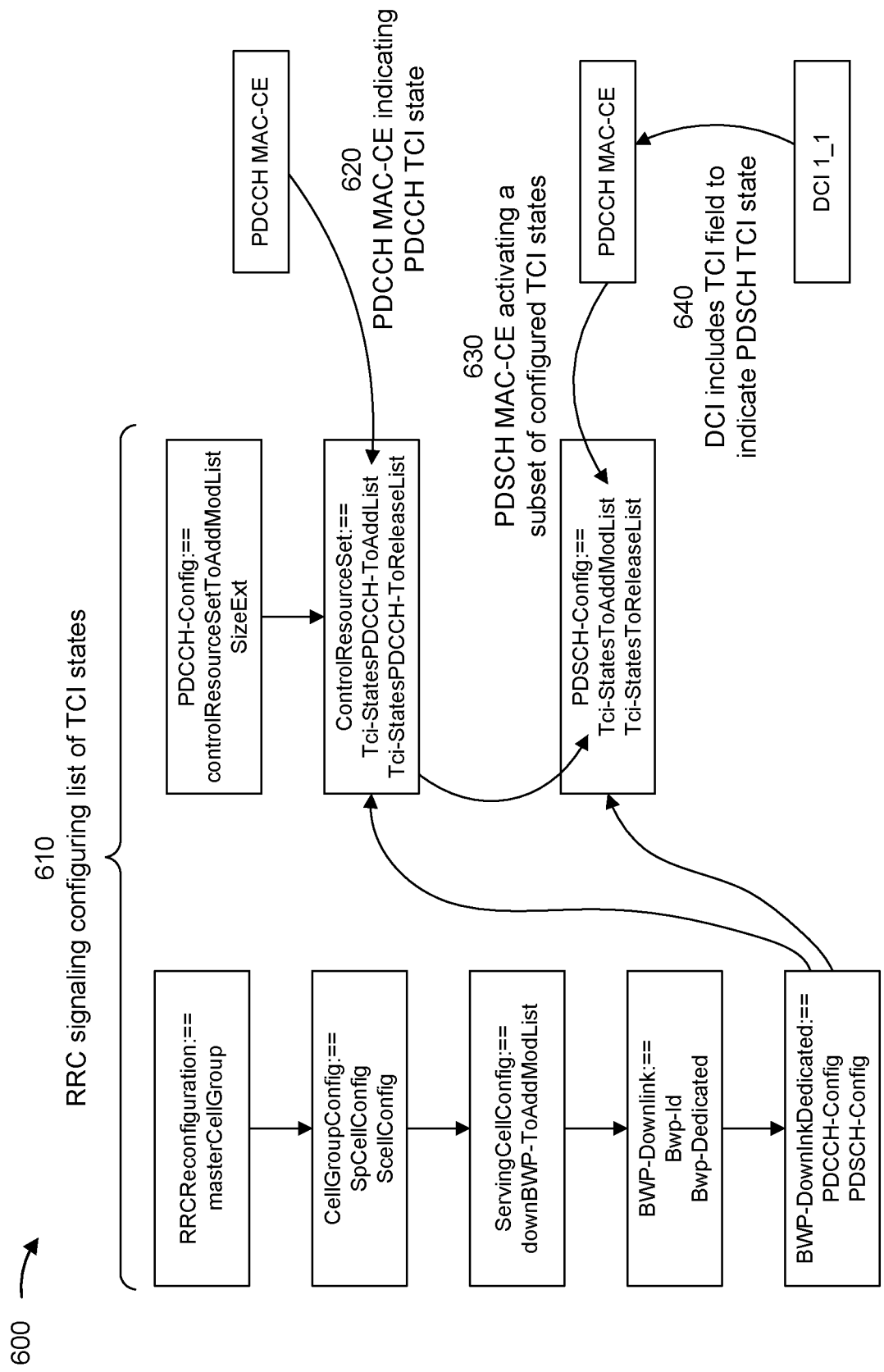
FIG. 6 is a diagram illustrating an example of a transmission configuration indication state configuration for beams used in access link communications in accordance with the present disclosure.

FIG. 6 is a diagram illustrating an example 600 of a TCI state configuration for beams used in access link communications in accordance with the present disclosure. As shown in FIG. 6, reference number 610 depicts RRC signaling that a network node may transmit to a UE in order to configure one or more TCI states to be used for beamformed communication. For example, FIG. 6 illustrates an example where the network node may transmit an RRC reconfiguration message to a UE to configure a list of TCI states that may be used for downlink communication on a PDCCH or a PDSCH. Additionally or alternatively, in cases where the network node and the UE are communicating in a wireless network that supports a unified TCI framework, the RRC configuration message may be used to configure one or more TCI states that can be used for a joint downlink and uplink beam indication or one or more TCI states that can be used for separate downlink and uplink beam indications. Accordingly, as described herein, the example 600 shown in FIG. 6 may be used to configure one or more TCI states for access link (for example, downlink or uplink) communications.

For example, the RRC signaling depicted by reference number 610 may generally include an RRC reconfiguration message that carries a master cell group information element (IE), where the RRC reconfiguration message may be provided at a top level of an IE hierarchy in which each downstream IE is included in an upstream IE (for example, a cell group configuration IE may be included in the master cell group IE, a serving cell configuration IE may be included in the cell group configuration IE, a downlink bandwidth part IE may be included in the serving cell configuration IE, and a dedicated downlink bandwidth part IE may be included in the downlink bandwidth part IE). As further shown in FIG. 6, the dedicated downlink bandwidth part IE may include a PDCCH configuration and a PDSCH configuration, which may include one or more IEs to configure TCI states that the UE may use to receive PDCCH and PDSCH transmissions from the network node. For example, as shown, the PDSCH configuration may include a tci-StatesToAddModList parameter that indicates one or more TCI states to be added to a list of TCI states that are configured for PDSCH transmissions or a tci-StatesToReleaseList parameter that indicates one or more TCI states to be released (for example, removed) from the list of TCI states configured for PDSCH transmissions. Furthermore, the PDCCH configuration may include a CORESET configuration in which a tci-StatesPDCCH-ToAddList parameter indicates a list of TCI state identifiers included in the list of TCI states configured for PDSCH transmissions that are also configured for PDCCH transmissions and further in which a tci-StatesPDCCH-ToReleaseList parameter indicates one or more TCI state identifiers that the UE is to release from the list of TCI states configured for PDCCH transmissions.

In general, as described herein, each TCI state that is configured for the UE may contain one or more parameters to configure a QCL relationship between one or two reference signals and one or more DMRS ports associated with a PDSCH, one or more DMRS ports associated with a PDCCH, or one or more CSI-RS ports associated with a CSI-RS resource. For example, the RRC reconfiguration message may include one or more parameters to indicate, for each TCI state in the list of TCI states that are configured for the UE, an identifier associated with the respective TCI state and a maximum of two QCL types to indicate QCL information or QCL relationships per TCI state. For example, the RRC reconfiguration message may include a qcl-Type1 parameter to indicate a first QCL relationship for a first downlink reference signal (for example, an SSB or a CSI-RS), and may optionally further include a qcl-Type2 parameter to indicate a second QCL relationship for a second downlink reference signal. Accordingly, as shown in FIG. 6, reference number 620 depicts a UE-specific PDCCH MAC-CE that may include a TCI state indication to indicate QCL information associated with a PDCCH transmission, where the TCI state indication in the PDCCH MAC-CE includes a TCI state identifier in the list of TCI state identifiers that are configured for PDCCH transmissions. Furthermore, reference number 630 depicts a UE-specific PDSCH MAC-CE, which the network node may use to activate a set of M TCI states (for example, up to eight (8) or sixteen (16) TCI states) included in the list of TCI states that are configured for PDSCH transmissions. As shown in FIG. 6, reference number 640 depicts a DCI message (for example, having DCI format 1_1) that includes a TCI field to indicate one of the M TCI states activated by the UE-specific PDSCH MAC-CE, whereby the UE uses the TCI state indicated in the TCI field of the DCI message to receive a PDSCH transmission scheduled by the DCI message.

In sidelink communication, where two or more UEs communicate directly using one or more sidelink channels (for example, without using a network node as an intermediary), the sidelink communication may be performed in a first transmission mode (for example, transmission mode 1) where resource selection or scheduling is performed by a network node or in a second transmission mode (for example, transmission mode 2) where resource selection or scheduling is performed by a transmitting UE. In cases where the sidelink communication is performed in the first transmission mode, the network node grants a sidelink resource to a transmitting UE, and the transmitting UE then uses the sidelink resource to transmit a sidelink communication to one or more receiving UEs. However, in cases where the sidelink transmission may potentially cause interference with access link (for example, downlink or uplink) communications in certain beam directions, the network node may be unable to indicate, to the transmitting UE, a particular sidelink beam that the transmitting UE is to use to mitigate the potential interference because the network node may only be able to roughly estimate a range of suitable beam directions for the sidelink transmission (for example, because sidelink communication is often configured for one-to-many transmissions or because the network node is unaware of the precise position of the receiving UE(s)). Furthermore, in cases where a transmitting UE is connected to multiple receiving UEs on respective sidelink channels, a network node operating in the first transmission mode grants only a sidelink resource to the transmitting UE, and the transmitting UE can then determine which sidelink is to use the granted sidelink resource. In such cases, an exact beam indication by the network node would be inappropriate, because the network node could potentially indicate a sidelink beam that is steered in a beam direction other than a beam direction of the receiving UE(s) intended to receive the sidelink transmission. Accordingly, existing sidelink scheduling techniques suffer from drawbacks that prevent network nodes from having the ability to control sidelink beam selection (for example, to mitigate interference with access link communications).

Various aspects relate generally to a network indication to control sidelink beam selection by a transmitting UE in a sidelink transmission mode where a network node performs resource selection or scheduling. Some aspects more specifically relate to a network node transmitting, to a transmitting UE, a DCI message carrying a sidelink grant that indicates a sidelink resource that the transmitting UE can use to transmit a sidelink communication in addition to a set of sidelink beams associated with the sidelink communication. For example, the set of sidelink beams indicated in the sidelink grant may correspond to a set of sidelink beams that are eligible to be selected by the transmitting UE as a sidelink beam used to transmit the sidelink communication, or the indicated set of sidelink beams may correspond to a set of sidelink beams that are ineligible to be selected as the sidelink beam. Some aspects further relate to semi-static (for example, RRC) signaling that can be used to configure sidelink neighborhood beam information that defines a set of neighboring sidelink beams (for example, adjacent sidelink beams) associated with one or more TCI states and to dynamic (for example, MAC-CE or DCI) signaling formats that can be used to enable the network node to indicate the set of beams in the sidelink grant.

Particular aspects of the subject matter described in this disclosure can be implemented to realize one or more of the following potential advantages. In some examples, the described techniques can be used to enable a network node to indicate a set of sidelink beams such that the network node can limit a sidelink transmission to a certain range of beam directions and thereby mitigate or otherwise control potential interference that a sidelink transmission may cause in a certain direction. For example, the network node may determine a set of sidelink beams that cause an acceptable level of interference at the network node (for example, a level of interference satisfying a threshold) or a set of sidelink beams that cause unacceptable interference at the network node (for example, a level of interference failing to satisfy the threshold), and may indicate a set of eligible or ineligible sidelink beams to the transmitting UE to mitigate or otherwise control the level of interference caused by the sidelink transmission of the transmitting UE. Furthermore, the beam indication provided to the transmitting UE may be configured such that the transmitting UE can select a sidelink beam from multiple candidate sidelink beams that are associated with acceptable interference levels (for example, any sidelink beam included in a set of sidelink beams that the network node indicates are eligible to be selected as the sidelink beam, or any sidelink beam that is not included in a set of sidelink beams that the network node indicates are ineligible to be selected as the sidelink beam). In this way, the network node has the ability to exert partial control over the sidelink beam that the transmitting UE uses for the sidelink transmission, and the transmitting UE has flexibility to select a specific sidelink beam to use to connect to a receiving UE.

Figure 7A:
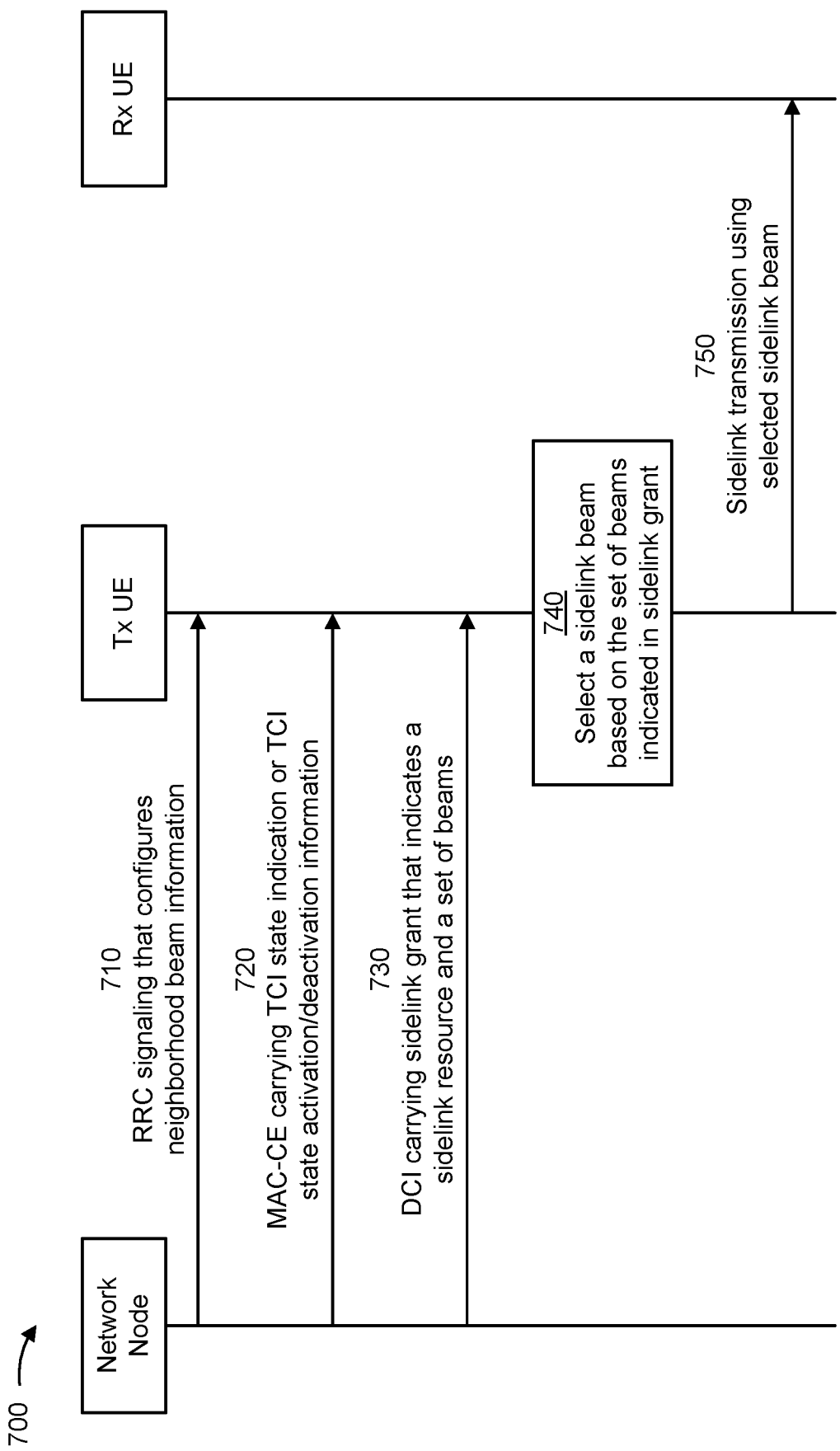
FIGS. 7A-7B are diagrams illustrating examples associated with a network indication to control sidelink beam selection in accordance with the present disclosure.
Figure 7B:
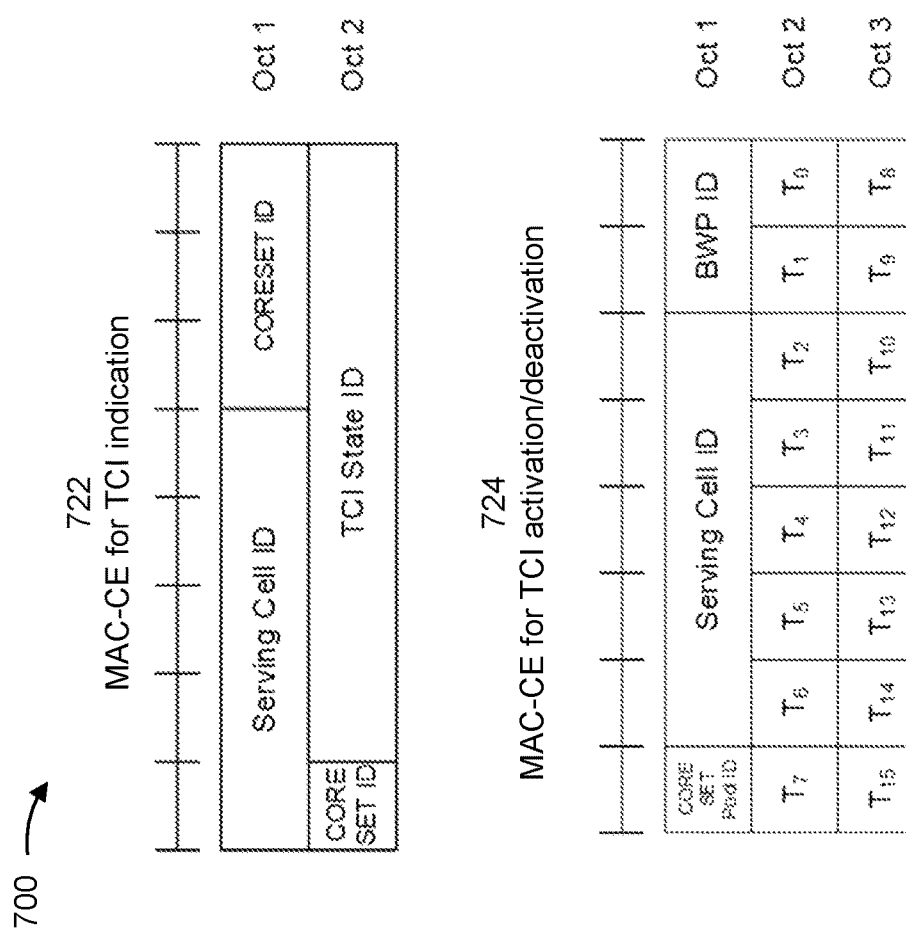

FIGS. 7A-7B are diagrams illustrating examples associated with a network indication to control sidelink beam selection in accordance with the present disclosure. As shown in FIG. 7A, example 700 includes a transmitting UE (shown as Tx UE) and a receiving UE (shown as Rx UE) that may communicate via a wireless sidelink and a network node that may communicate with the transmitting UE via a wireless access link, which may include an uplink and a downlink. In some aspects, the network node, the Tx UE, and the Rx UE may be included in a wireless network, such as wireless network 100, and sidelink communications between the Tx UE and the Rx UE may be performed according to a sidelink transmission mode in which the network node performs sidelink resource selection and scheduling (for example, transmission mode 1).

In a first operation 710, the network node may transmit, and the transmitting UE may receive, RRC signaling that configures (for example, semi-statically) neighborhood beam information associated with a set of sidelink transmit beams. For example, as described herein, the neighborhood beam information may generally define, among the set of sidelink transmit beams, one or more groups of multiple sidelink beams that are adjacent to one another or otherwise associated with neighboring beam directions. Accordingly, when the network node subsequently transmits a sidelink grant to the transmitting UE to indicate a sidelink resource allocation for a sidelink communication to be transmitted by the transmitting UE (for example, a set of time and frequency resources in which the transmitting UE is to transmit the sidelink communication on a PSCCH or a PSSCH), the sidelink grant may also include a sidelink TCI field that indicates a set of sidelink transmit beams associated with the sidelink communication. For example, in some aspects, the set of sidelink transmit beams indicated in the sidelink grant may define a set of sidelink transmit beams that are eligible to be used to transmit the sidelink communication (for example, a set of sidelink beams that are associated with acceptable access link interference levels) or a set of sidelink transmit beams that are ineligible to be used to transmit the sidelink communication (for example, a set of sidelink beams that are associated with unacceptable access link interference levels). Accordingly, although the network node may be unable to exactly control which sidelink transmit beam is used by the transmitting UE, the network node may indicate the set of sidelink transmit beams in the sidelink grant to exert partial control over which sidelink transmit beam is used by the transmitting UE and thereby mitigate potential interference with uplink transmissions to the network node or with downlink transmissions by the network node. For example, the neighborhood beam information configured by the RRC signaling may enable the network node to configure one or more beam sets that are indicated to the transmitting UE as being eligible or ineligible to use to transmit a sidelink communication.

For example, to configure the neighborhood beam information for the sidelink transmit beams, the RRC signaling may indicate a set of sidelink transmit beams that are associated with each TCI state in a set of TCI states that are configured for the transmitting UE. For example, the set of sidelink transmit beams associated with each respective TCI state may include multiple sidelink transmit beams that are adjacent to one another, associated with neighboring beam directions, or associated with similar access link interference levels, among other examples. Additionally or alternatively, the RRC signaling may explicitly configure the neighborhood beam information for the sidelink transmit beams using a data structure that defines sidelink transmit beams that are adjacent to one another, associated with neighboring beam directions, or associated with similar access link interference levels. For example, in some aspects, the data structure may include an adjacency matrix having m rows that each correspond to a different TCI state associated with one or more sidelink transmit beams and n columns that each correspond to a different TCI state associated with one or more sidelink transmit beams, where m and n may generally have the same value (for example, a TCI state associated with a particular column may also be associated with a row, such as a 64×64 adjacency matrix for a TCI framework with sixty-four (64) TCI states). In cases where an adjacency matrix having m rows and n columns is used to explicitly configure the neighborhood beam information for the sidelink transmit beams, a first value (such as a one) in an entry in an m-th row and an n-th column may indicate that the sidelink transmit beam(s) associated with the m-th TCI state is adjacent to or associated with a neighboring beam direction of the sidelink transmit beam(s) associated with the n-th TCI state. Correlatively, a second value (such as a zero) in the entry in the m-th row and the n-th column may indicate that the sidelink transmit beam(s) associated with the m-th TCI state are not adjacent to or are otherwise associated with non-neighboring beam directions of the sidelink transmit beam(s) associated with the n-th TCI state. Furthermore, in addition to configuring the neighborhood beam information for various sidelink transmit beams, the RRC signaling may include a parameter to configure a quantity of adjacent or neighboring sidelink transmit beams that are simultaneously activated (for example, to limit or otherwise control a size of a set of neighboring sidelink transmit beams).

In a second operation 720, the network node may transmit, and the transmitting UE may receive, a MAC-CE that carries a TCI state indication or TCI state activation or deactivation information based on the neighborhood beam information configured by the RRC signaling. For example, in cases where the RRC signaling configures the neighborhood beam information by indicating a respective set of sidelink transmit beams associated with each TCI state configured for the UE, the MAC-CE may be a TCI indication MAC-CE or a TCI activation or deactivation MAC-CE that is used to indicate, activate, or deactivate all sidelink transmit beams associated with the TCI state(s) indicated in the MAC-CE. For example, referring to FIG. 7B, reference number 722 depicts an example format for the TCI indication MAC-CE, where a serving cell identifier is indicated in a first octet, a CORESET identifier is indicated in three bits of the first octet and one bit of a second octet, and the remaining seven bits in the second octet are used to indicate an identifier of a TCI state. Accordingly, in cases where the RRC signaling indicates a respective set of sidelink transmit beams associated with each TCI state, the field in the TCI indication MAC-CE that indicates the identifier of a TCI state may be used to indicate all the sidelink transmit beams that are associated with the indicated TCI state identifier. Similarly, reference number 724 depicts an example format for the TCI activation or deactivation MAC-CE, where a first octet indicates a bandwidth part identifier, a serving cell identifier, and a CORESET pool identifier, and one or more subsequent octets each include eight bits to indicate an identifier of a TCI state to activate or deactivate. Accordingly, in cases where the RRC signaling indicates a respective set of sidelink transmit beams associated with each TCI state, octets two through N in the TCI activation or deactivation MAC-CE may be used to indicate that all the sidelink transmit beams that are associated with the TCI state identifiers indicated in octets two through N are activated or deactivated.

In some other aspects, in cases where the RRC signaling explicitly configures the neighborhood beam information (for example, in an adjacency matrix or other suitable data structure) and indicates the quantity of adjacent or neighboring sidelink transmit beams that are simultaneously activated, X, the TCI indication MAC-CE or the TCI activation or deactivation MAC-CE may be used to indicate, activate, or deactivate the sidelink transmit beam associated with the TCI state(s) indicated in the MAC-CE and the X sidelink transmit beams that are adjacent to the sidelink transmit beam associated with the TCI state(s) indicated in the MAC-CE. For example, when the network node transmits the TCI indication MAC-CE depicted by reference number 722 to the transmitting UE, the TCI indication MAC-CE may be interpreted by the transmitting UE as an indication of the TCI state corresponding to the TCI state identifier in the second octet and the X adjacent sidelink transmit beams (for example, based on the RRC-configured adjacency information). Furthermore, in cases where the TCI indication MAC-CE is transmitted to the transmitting UE, the TCI indication MAC-CE may include a bit to indicate whether the indicated sidelink beam and the X adjacent sidelink transmit beams are included or excluded from a set of sidelink beams that are eligible to be selected as a sidelink beam used to transmit a sidelink communication. Similarly, when the TCI activation or deactivation MAC-CE depicted by reference number 724 is transmitted to the transmitting UE, the TCI activation or deactivation MAC-CE is used to activate or deactivate one or more sidelink transmit beams that are associated with the TCI state(s) indicated in octet two through octet N and to simultaneously activate or deactivate the X sidelink transmit beams that are adjacent to the sidelink transmit beam(s) associated with the TCI state(s) indicated in octet two through octet N.

In some aspects, the TCI indication MAC-CE or the TCI activation or deactivation MAC-CE may indicate a new value for X, which may override any RRC-configured value for the quantity of simultaneously activated adjacent or neighboring sidelink transmit beams. For example, the TCI indication MAC-CE may indicate a new value for X such that the TCI indication MAC-CE is interpreted as an indication for the sidelink transmit beam indicated in the second octet and an indication of the X adjacent sidelink transmit beams, where X has the new value indicated in the TCI indication MAC-CE. In a similar manner, the TCI activation or deactivation MAC-CE may indicate a new value for X such that the TCI activation or deactivation MAC-CE is interpreted as simultaneously activating or deactivating the sidelink transmit beams indicated in the second octet through the Nth octet and the X adjacent sidelink transmit beams for each of the sidelink transmit beams indicated in the second octet through the Nth octet, where X has the new value indicated in the TCI activation or deactivation MAC-CE.

In some other aspects, the RRC signaling may not include any information related to adjacent sidelink transmit beams, in which case the MAC-CE may be used to indicate the neighborhood beam information according to one or more sets of simultaneously activated sidelink transmit beams. For example, in FIG. 7B, reference number 726 depicts a MAC-CE format in which one or more beam sets are each associated with a respective set of TCI states to indicate one or more sidelink transmit beams that are simultaneously activated. For example, as shown in FIG. 7B, a first beam set (beam set 1) may include a first set of one or more octets that each indicate a TCI state included in the first beam set, and this pattern may repeat to indicate up to K beam sets that are each associated with one or more TCI states (for example, the CO field in the octet for the first TCI state in a beam set may indicate a boundary of the beam set). Accordingly, in such cases, all of the beams that are associated with a particular beam set (for example, the beams associated with the one or more TCI states included in a beam set) may be indicated, activated, or deactivated using a single TCI codepoint associated with any of the TCI states included in the beam set. For example, to indicate all of the beams corresponding to TCI state 1 through TCI state n in beam set K, a DCI message may indicate a single TCI codepoint corresponding to any one of TCI states 1 through n.

Referring again to FIG. 7A, in a third operation 730, the network node may transmit, and the transmitting UE may receive, a DCI message carrying a sidelink grant that indicates a sidelink resource (for example, a set of time and frequency resources) that the transmitting UE may use to transmit a sidelink communication and a set of beams associated with the sidelink communication. For example, in some aspects, the sidelink grant may be indicated in a DCI message associated with a sidelink scheduling format (for example, DCI format 3_0), and the sidelink grant may include a sidelink TCI field to indicate a TCI state. Accordingly, as described herein, the TCI state indicated in the sidelink TCI field may be associated with one or more sidelink transmit beams, and the transmitting UE may interpret the sidelink TCI field in a manner that depends on the particular RRC signaling or MAC-CE format used to configure the association(s) between a TCI state and a set of sidelink transmit beams. For example, in cases where the RRC signaling or the MAC-CE indicates the quantity of simultaneously activated sidelink transmit beams, X, the configured quantity of simultaneously activated sidelink transmit beams may be indicated in the sidelink grant.

In general, however, the transmitting UE may use the TCI state indicated in the sidelink TCI field to determine a set of sidelink transmit beams that are associated with the sidelink communication, which may limit or otherwise control which sidelink beam the transmitting UE selects as a sidelink beam to use to transmit the sidelink communication. For example, in some aspects, the set of sidelink transmit beams indicated in the sidelink grant may correspond to sidelink transmit beams that are eligible to be selected as the sidelink beam to use to transmit the sidelink communication or to sidelink transmit beams that are ineligible to be selected as the sidelink beam to use to transmit the sidelink communication (for example, based on potential interference with access link communications). For example, whether the transmitting UE is allowed or prohibited from using the set of sidelink transmit beams indicated in the sidelink grant may depend on the quantity of suitable sidelink transmit beams associated with acceptable interference levels or the quantity of sidelink transmit beams associated with unacceptable interference levels (for example, the sidelink grant may indicate sidelink beams that are eligible to use in cases where there is a relatively small quantity of eligible sidelink beams or may indicate sidelink beams that are ineligible to use in cases where the quantity of ineligible sidelink beams is less than the quantity of eligible sidelink beams). For example, in some aspects, the sidelink TCI field in the sidelink grant may include a bit to indicate whether the set of sidelink transmit beams indicated in the sidelink grant are included in or excluded from a set of candidate sidelink transmit beams that are eligible to be selected as the sidelink transmit beam for the sidelink communication.

In a fourth operation 740, the transmitting UE may then select a sidelink beam to use to transmit the sidelink communication in the granted sidelink resource based at least in part on the set of sidelink beams indicated in the sidelink grant. For example, in cases where the set of sidelink beams indicated in the sidelink grant correspond to a set of candidate sidelink beams that are eligible to be selected as the sidelink transmit beam for the sidelink communication, the transmitting UE may select the sidelink beam from the set of sidelink transmit beams indicated in the sidelink grant. In some other aspects, in cases where the set of sidelink beams indicated in the sidelink grant are ineligible to be selected as the sidelink transmit beam for the sidelink communication, the transmitting UE may select the sidelink beam from a set of sidelink transmit beams that excludes the set of sidelink beams indicated in the sidelink grant. In a fifth operation 750, the transmitting UE may then transmit the sidelink communication (for example, a PSCCH communication or a PSSCH communication) to the receiving UE in the sidelink resource indicated in the sidelink grant via the sidelink beam selected by the transmitting UE.

FIG. 8 is a flowchart illustrating an example process 800 performed, for example, by a transmitting UE that supports a network indication to control sidelink beam selection in accordance with the present disclosure. Example process 800 is an example where the transmitting UE (for example, UE 120, UE 305-1, UE 305-2, Tx/Rx UE 405, or Rx/Tx UE 410) performs operations associated with a network indication to control sidelink beam selection.

As shown in FIG. 8, in some aspects, process 800 may include receiving, from a network node, a sidelink grant that indicates a sidelink resource and indicates a set of sidelink beams associated with a sidelink communication using the sidelink resource (block 810). For example, the transmitting UE (such as by using communication manager 140 or reception component 1002, depicted in FIG. 10) may receive, from a network node, a sidelink grant that indicates a sidelink resource and indicates a set of sidelink beams associated with a sidelink communication using the sidelink resource, as described above.

As further shown in FIG. 8, in some aspects, process 800 may include selecting, based at least in part on the set of sidelink beams indicated in the sidelink grant, a sidelink beam for the sidelink communication (block 820). For example, the transmitting UE (such as by using communication manager 140 or sidelink beam selection component 1008, depicted in FIG. 10) may select, based at least in part on the set of sidelink beams indicated in the sidelink grant, a sidelink beam for the sidelink communication, as described above.

As further shown in FIG. 8, in some aspects, process 800 may include transmitting, via the selected sidelink beam, the sidelink communication to one or more receiving UEs using the sidelink resource indicated in the sidelink grant (block 830). For example, the transmitting UE (such as by using communication manager 140 or transmission component 1004, depicted in FIG. 10) may transmit, via the selected sidelink beam, the sidelink communication to one or more receiving UEs using the sidelink resource indicated in the sidelink grant, as described above.

Process 800 may include additional aspects, such as any single aspect or any combination of aspects described below or in connection with one or more other processes described elsewhere herein.

In a first additional aspect, the set of sidelink beams indicated in the sidelink grant includes multiple sidelink beams that are eligible to be selected as the sidelink beam used to transmit the sidelink communication.

In a second additional aspect, alone or in combination with the first aspect, the set of sidelink beams indicated in the sidelink grant includes one or more sidelink beams that are ineligible to be selected as the sidelink beam used to transmit the sidelink communication.

In a third additional aspect, alone or in combination with one or more of the first and second aspects, a bit in the sidelink grant has a first value that indicates that the set of sidelink beams are eligible to be selected as the sidelink beam used to transmit the sidelink communication or a second value that indicates that the set of sidelink beams are ineligible to be selected as the sidelink beam used to transmit the sidelink communication.

In a fourth additional aspect, alone or in combination with one or more of the first through third aspects, process 800 includes receiving, from the network node, RRC signaling that configures, for each TCI state in a set of TCI states, a respective set of sidelink transmit beams associated with the TCI state, wherein the sidelink grant indicates the set of sidelink beams associated with the sidelink communication in a TCI field that identifies a TCI state in the set of TCI states.

In a fifth additional aspect, alone or in combination with one or more of the first through fourth aspects, process 800 includes receiving, from the network node, a TCI indication MAC-CE that includes an identifier for a TCI state in the set of TCI states that indicates the respective set of sidelink transmit beams associated with the TCI state.

In a sixth additional aspect, alone or in combination with one or more of the first through fifth aspects, process 800 includes receiving, from the network node, a TCI activation or deactivation MAC-CE that includes an identifier for each of one or more TCI states in the set of TCI states that activates or deactivates the respective set of sidelink transmit beams associated with the respective TCI state.

In a seventh additional aspect, alone or in combination with one or more of the first through sixth aspects, process 800 includes receiving, from the network node, RRC signaling that configures a data structure that indicates sidelink beam neighborhood information for each TCI state in a set of TCI states, wherein the sidelink grant indicates the set of sidelink beams associated with the sidelink communication in a TCI field that identifies a TCI state in the set of TCI states.

In an eighth additional aspect, alone or in combination with one or more of the first through seventh aspects, process 800 includes receiving, from the network node, a TCI activation or deactivation MAC-CE that includes an identifier for each of one or more TCI states in the set of TCI states that activates or deactivates one or more respective sidelink transmit beams associated with the respective TCI state and activates or deactivates one or more sidelink transmit beams that the data structure indicates are adjacent to the sidelink transmit beams associated with the one or more TCI states.

In a ninth additional aspect, alone or in combination with one or more of the first through eighth aspects, process 800 includes receiving, from the network node, a TCI indication MAC-CE that includes an identifier for a TCI state in the set of TCI states that indicates a sidelink transmit beam associated with the TCI state and one or more sidelink transmit beams that the data structure indicates are adjacent to the sidelink transmit beam.

In a tenth additional aspect, alone or in combination with one or more of the first through ninth aspects, process 800 includes receiving, from the network node, a MAC-CE that indicates a quantity of adjacent sidelink transmit beams to be simultaneously activated, deactivated, or indicated.

In an eleventh additional aspect, alone or in combination with one or more of the first through tenth aspects, the sidelink grant indicates a quantity of adjacent sidelink transmit beams to be simultaneously activated, deactivated, or indicated.

In a twelfth additional aspect, alone or in combination with one or more of the first through eleventh aspects, process 800 includes receiving, from the network node, a MAC-CE that indicates one or more sets of sidelink transmit beams that are each associated with a respective set of TCI states, wherein the sidelink grant indicates the set of sidelink beams associated with the sidelink communication in a TCI field that identifies a TCI state in the set of TCI states.

In a thirteenth additional aspect, alone or in combination with one or more of the first through twelfth aspects, process 800 includes receiving, from the network node, RRC signaling that configures a quantity of adjacent sidelink transmit beams included in a set of simultaneously activated sidelink transmit beams, wherein the set of sidelink beams indicated in the sidelink grant is included in the set of simultaneously activated sidelink transmit beams.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
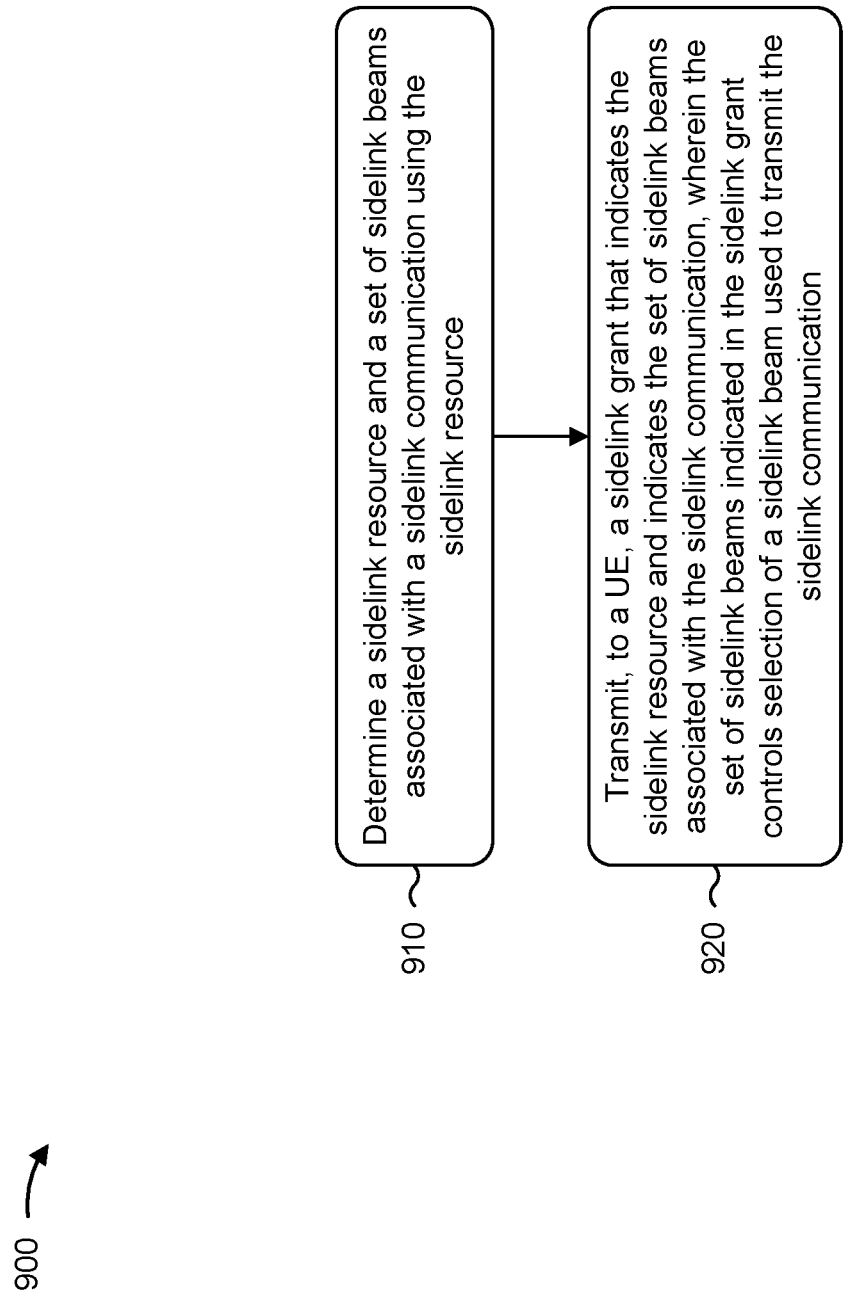
FIG. 9 is a flowchart illustrating an example process performed, for example, by a network node in accordance with the present disclosure.

FIG. 9 is a flowchart illustrating an example process 900 performed, for example, by a network node that supports a network indication to control sidelink beam selection in accordance with the present disclosure. Example process 900 is an example where the network node (for example, network node 110) performs operations associated with a network indication to control sidelink beam selection.

As shown in FIG. 9, in some aspects, process 900 may include determining a sidelink resource and a set of sidelink beams associated with a sidelink communication using the sidelink resource (block 910). For example, the network node (such as by using communication manager 150 or sidelink beam control component 1108, depicted in FIG. 11) may determine a sidelink resource and a set of sidelink beams associated with a sidelink communication using the sidelink resource, as described above.

As further shown in FIG. 9, in some aspects, process 900 may include transmitting, to a UE, a sidelink grant that indicates the sidelink resource and indicates the set of sidelink beams associated with the sidelink communication, wherein the set of sidelink beams indicated in the sidelink grant controls selection of a sidelink beam used to transmit the sidelink communication (block 920). For example, the network node (such as by using communication manager 150 or transmission component 1104, depicted in FIG. 11) may transmit, to a UE, a sidelink grant that indicates the sidelink resource and indicates the set of sidelink beams associated with the sidelink communication, wherein the set of sidelink beams indicated in the sidelink grant controls selection of a sidelink beam used to transmit the sidelink communication, as described above.

Process 900 may include additional aspects, such as any single aspect or any combination of aspects described below or in connection with one or more other processes described elsewhere herein.

In a first additional aspect, the set of sidelink beams indicated in the sidelink grant includes multiple sidelink beams that are eligible to be selected as the sidelink beam used to transmit the sidelink communication.

In a second additional aspect, alone or in combination with the first aspect, the set of sidelink beams indicated in the sidelink grant includes one or more sidelink beams that are ineligible to be selected as the sidelink beam used to transmit the sidelink communication.

In a third additional aspect, alone or in combination with one or more of the first and second aspects, a bit in the sidelink grant has a first value that indicates that the set of sidelink beams are eligible to be selected as the sidelink beam used to transmit the sidelink communication or a second value that indicates that the set of sidelink beams are ineligible to be selected as the sidelink beam used to transmit the sidelink communication.

In a fourth additional aspect, alone or in combination with one or more of the first through third aspects, process 900 includes transmitting, to the UE, RRC signaling that configures, for each TCI state in a set of TCI states, a respective set of sidelink transmit beams associated with the TCI state, wherein the sidelink grant indicates the set of sidelink beams associated with the sidelink communication in a TCI field that identifies a TCI state in the set of TCI states.

In a fifth additional aspect, alone or in combination with one or more of the first through fourth aspects, process 900 includes transmitting, to the UE, a TCI indication MAC-CE that includes an identifier for a TCI state in the set of TCI states that indicates the respective set of sidelink transmit beams associated with the TCI state.

In a sixth additional aspect, alone or in combination with one or more of the first through fifth aspects, process 900 includes transmitting, to the UE, a TCI activation or deactivation MAC-CE that includes an identifier for each of one or more TCI states in the set of TCI states that activates or deactivates the respective set of sidelink transmit beams associated with the respective TCI state.

In a seventh additional aspect, alone or in combination with one or more of the first through sixth aspects, process 900 includes transmitting, to the UE, RRC signaling that configures a data structure that indicates sidelink beam neighborhood information for each TCI state in a set of TCI states, wherein the sidelink grant indicates the set of sidelink beams associated with the sidelink communication in a TCI field that identifies a TCI state in the set of TCI states.

In an eighth additional aspect, alone or in combination with one or more of the first through seventh aspects, process 900 includes transmitting, to the UE, a TCI activation or deactivation MAC-CE that includes an identifier for each of one or more TCI states in the set of TCI states that activates or deactivates one or more respective sidelink transmit beams associated with the respective TCI state and activates or deactivates one or more sidelink transmit beams that the data structure indicates are adjacent to the sidelink transmit beams associated with the one or more TCI states.

In a ninth additional aspect, alone or in combination with one or more of the first through eighth aspects, process 900 includes transmitting, to the UE, a TCI indication MAC-CE that includes an identifier for a TCI state in the set of TCI states that indicates a sidelink transmit beam associated with the TCI state and one or more sidelink transmit beams that the data structure indicates are adjacent to the sidelink transmit beam.

In a tenth additional aspect, alone or in combination with one or more of the first through ninth aspects, process 900 includes transmitting, to the UE, a MAC-CE that indicates a quantity of adjacent sidelink transmit beams to be simultaneously activated, deactivated, or indicated.

In an eleventh additional aspect, alone or in combination with one or more of the first through tenth aspects, the sidelink grant indicates a quantity of adjacent sidelink transmit beams to be simultaneously activated, deactivated, or indicated.

In a twelfth additional aspect, alone or in combination with one or more of the first through eleventh aspects, process 900 includes transmitting, to the UE, a MAC-CE that indicates one or more sets of sidelink transmit beams that are each associated with a respective set of TCI states, wherein the sidelink grant indicates the set of sidelink beams associated with the sidelink communication in a TCI field that identifies a TCI state in the set of TCI states.

In a thirteenth additional aspect, alone or in combination with one or more of the first through twelfth aspects, process 900 includes transmitting, to the UE, RRC signaling that configures a quantity of adjacent sidelink transmit beams included in a set of simultaneously activated sidelink transmit beams, wherein the set of sidelink beams indicated in the sidelink grant is included in the set of simultaneously activated sidelink transmit beams.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
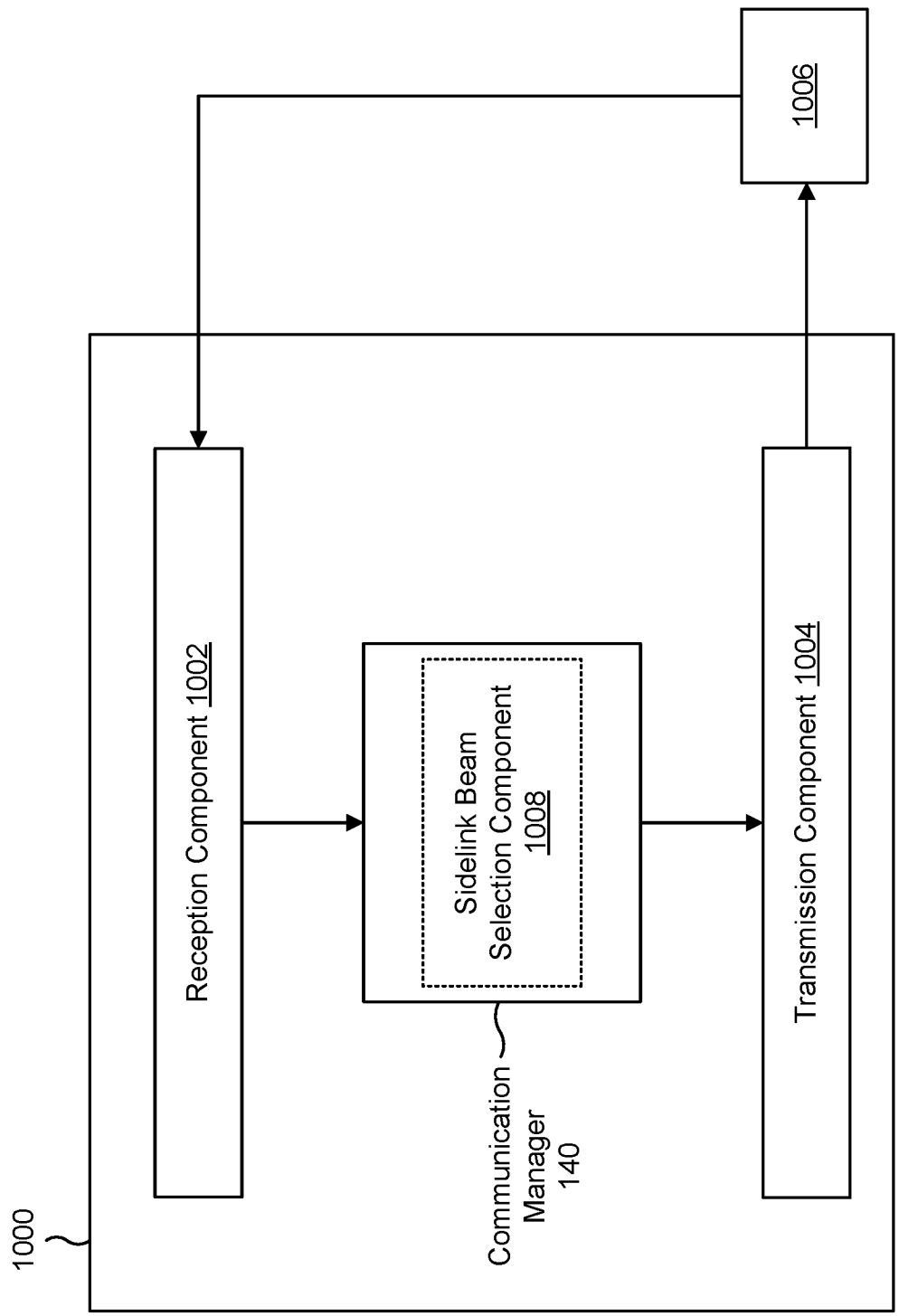
FIGS. 10-11 are diagrams of example apparatuses for wireless communication in accordance with the present disclosure.

FIG. 10 is a diagram of an example apparatus 1000 for wireless communication that supports a network indication to control sidelink beam selection in accordance with the present disclosure. The apparatus 1000 may be a transmitting UE, or a transmitting UE may include the apparatus 1000. In some aspects, the apparatus 1000 includes a reception component 1002, a transmission component 1004, and a communication manager 140, which may be in communication with one another (for example, via one or more buses). As shown, the apparatus 1000 may communicate with another apparatus 1006 (such as a UE, a network node, or another wireless communication device) using the reception component 1002 and the transmission component 1004.

In some aspects, the apparatus 1000 may be configured to perform one or more operations described herein in connection with FIGS. 7A-7B. Additionally or alternatively, the apparatus 1000 may be configured to perform one or more processes described herein, such as process 800 of FIG. 8. In some aspects, the apparatus 1000 may include one or more components of the transmitting UE described above in connection with FIG. 2.

The reception component 1002 may receive communications, such as reference signals, control information, data communications, or a combination thereof, from the apparatus 1006. The reception component 1002 may provide received communications to one or more other components of the apparatus 1000, such as the communication manager 140. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, a memory, or a combination thereof, of the transmitting UE described above in connection with FIG. 2.

The transmission component 1004 may transmit communications, such as reference signals, control information, data communications, or a combination thereof, to the apparatus 1006. In some aspects, the communication manager 140 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the transmitting UE described above in connection with FIG. 2. In some aspects, the transmission component 1004 may be co-located with the reception component 1002 in a transceiver.

The communication manager 140 may receive or may cause the reception component 1002 to receive, from a network node, a sidelink grant that indicates a sidelink resource and indicates a set of sidelink beams associated with a sidelink communication using the sidelink resource. The communication manager 140 may select, based at least in part on the set of sidelink beams indicated in the sidelink grant, a sidelink beam for the sidelink communication. The communication manager 140 may transmit or may cause the transmission component 1004 to transmit, via the selected sidelink beam, the sidelink communication to one or more receiving UEs using the sidelink resource indicated in the sidelink grant. In some aspects, the communication manager 140 may perform one or more operations described elsewhere herein as being performed by one or more components of the communication manager 140.

The communication manager 140 may include a controller/processor, a memory, or a combination thereof, of the transmitting UE described above in connection with FIG. 2. In some aspects, the communication manager 140 includes a set of components, such as a sidelink beam selection component 1008. Alternatively, the set of components may be separate and distinct from the communication manager 140. In some aspects, one or more components of the set of components may include or may be implemented within a controller/processor, a memory, or a combination thereof, of the transmitting UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive, from a network node, a sidelink grant that indicates a sidelink resource and indicates a set of sidelink beams associated with a sidelink communication using the sidelink resource. The sidelink beam selection component 1008 may select, based at least in part on the set of sidelink beams indicated in the sidelink grant, a sidelink beam for the sidelink communication. The transmission component 1004 may transmit, via the selected sidelink beam, the sidelink communication to one or more receiving UEs using the sidelink resource indicated in the sidelink grant.

The reception component 1002 may receive, from the network node, RRC signaling that configures, for each TCI state in a set of TCI states, a respective set of sidelink transmit beams associated with the TCI state, wherein the sidelink grant indicates the set of sidelink beams associated with the sidelink communication in a TCI field that identifies a TCI state in the set of TCI states.

The reception component 1002 may receive, from the network node, a TCI indication MAC-CE that includes an identifier for a TCI state in the set of TCI states that indicates the respective set of sidelink transmit beams associated with the TCI state.

The reception component 1002 may receive, from the network node, a TCI activation or deactivation MAC-CE that includes an identifier for each of one or more TCI states in the set of TCI states that activates or deactivates the respective set of sidelink transmit beams associated with the respective TCI state.

The reception component 1002 may receive, from the network node, RRC signaling that configures a data structure that indicates sidelink beam neighborhood information for each TCI state in a set of TCI states, wherein the sidelink grant indicates the set of sidelink beams associated with the sidelink communication in a TCI field that identifies a TCI state in the set of TCI states.

The reception component 1002 may receive, from the network node, a TCI activation or deactivation MAC-CE that includes an identifier for each of one or more TCI states in the set of TCI states that activates or deactivates one or more respective sidelink transmit beams associated with the respective TCI state and activates or deactivates one or more sidelink transmit beams that the data structure indicates are adjacent to the sidelink transmit beams associated with the one or more TCI states.

The reception component 1002 may receive, from the network node, a TCI indication MAC-CE that includes an identifier for a TCI state in the set of TCI states that indicates a sidelink transmit beam associated with the TCI state and one or more sidelink transmit beams that the data structure indicates are adjacent to the sidelink transmit beam.

The reception component 1002 may receive, from the network node, a MAC-CE that indicates a quantity of adjacent sidelink transmit beams to be simultaneously activated, deactivated, or indicated.

The reception component 1002 may receive, from the network node, a MAC-CE that indicates one or more sets of sidelink transmit beams that are each associated with a respective set of TCI states, wherein the sidelink grant indicates the set of sidelink beams associated with the sidelink communication in a TCI field that identifies a TCI state in the set of TCI states.

The reception component 1002 may receive, from the network node, RRC signaling that configures a quantity of adjacent sidelink transmit beams included in a set of simultaneously activated sidelink transmit beams, wherein the set of sidelink beams indicated in the sidelink grant is included in the set of simultaneously activated sidelink transmit beams.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
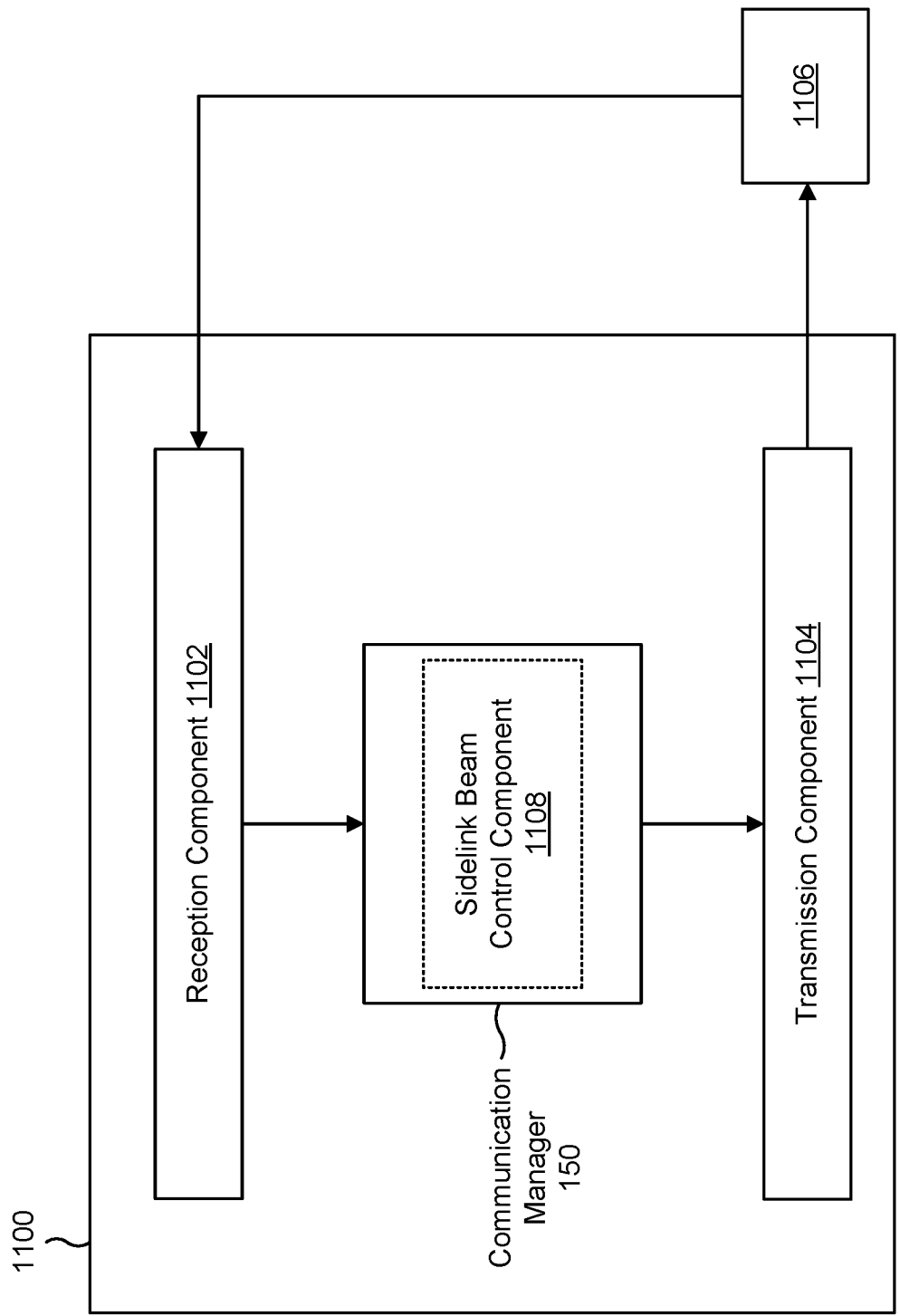

FIG. 11 is a diagram of an example apparatus 1100 for wireless communication that supports a network indication to control sidelink beam selection in accordance with the present disclosure. The apparatus 1100 may be a network node, or a network node may include the apparatus 1100. In some aspects, the apparatus 1100 includes a reception component 1102, a transmission component 1104, and a communication manager 150, which may be in communication with one another (for example, via one or more buses). As shown, the apparatus 1100 may communicate with another apparatus 1106 (such as a UE, a network node, or another wireless communication device) using the reception component 1102 and the transmission component 1104.

In some aspects, the apparatus 1100 may be configured to perform one or more operations described herein in connection with FIGS. 7A-7B. Additionally or alternatively, the apparatus 1100 may be configured to perform one or more processes described herein, such as process 900 of FIG. 9. In some aspects, the apparatus 1100 may include one or more components of the network node described above in connection with FIG. 2.

The reception component 1102 may receive communications, such as reference signals, control information, data communications, or a combination thereof, from the apparatus 1106. The reception component 1102 may provide received communications to one or more other components of the apparatus 1100, such as the communication manager 150. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a modem, a demodulator, a MIMO detector, a receive processor, a controller/processor, a memory, or a combination thereof, of the network node described above in connection with FIG. 2.

The transmission component 1104 may transmit communications, such as reference signals, control information, data communications, or a combination thereof, to the apparatus 1106. In some aspects, the communication manager 150 may generate communications and may transmit the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described above in connection with FIG. 2. In some aspects, the transmission component 1104 may be co-located with the reception component 1102 in a transceiver.

The communication manager 150 may determine a sidelink resource and a set of sidelink beams associated with a sidelink communication using the sidelink resource. The communication manager 150 may transmit or may cause the transmission component 1104 to transmit, to a UE, a sidelink grant that indicates the sidelink resource and indicates the set of sidelink beams associated with the sidelink communication, wherein the set of sidelink beams indicated in the sidelink grant controls selection of a sidelink beam used to transmit the sidelink communication. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the network node described above in connection with FIG. 2. In some aspects, the communication manager 150 includes a set of components, such as a sidelink beam control component 1108. Alternatively, the set of components may be separate and distinct from the communication manager 150. In some aspects, one or more components of the set of components may include or may be implemented within a controller/processor, a memory, a scheduler, a communication unit, or a combination thereof, of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The sidelink beam control component 1108 may determine a sidelink resource and a set of sidelink beams associated with a sidelink communication using the sidelink resource. The transmission component 1104 may transmit, to a UE, a sidelink grant that indicates the sidelink resource and indicates the set of sidelink beams associated with the sidelink communication, wherein the set of sidelink beams indicated in the sidelink grant controls selection of a sidelink beam used to transmit the sidelink communication.

The transmission component 1104 may transmit, to the UE, RRC signaling that configures, for each TCI state in a set of TCI states, a respective set of sidelink transmit beams associated with the TCI state, wherein the sidelink grant indicates the set of sidelink beams associated with the sidelink communication in a TCI field that identifies a TCI state in the set of TCI states.

The transmission component 1104 may transmit, to the UE, a TCI indication MAC-CE that includes an identifier for a TCI state in the set of TCI states that indicates the respective set of sidelink transmit beams associated with the TCI state.

The transmission component 1104 may transmit, to the UE, a TCI activation or deactivation MAC-CE that includes an identifier for each of one or more TCI states in the set of TCI states that activates or deactivates the respective set of sidelink transmit beams associated with the respective TCI state.

The transmission component 1104 may transmit, to the UE, RRC signaling that configures a data structure that indicates sidelink beam neighborhood information for each TCI state in a set of TCI states, wherein the sidelink grant indicates the set of sidelink beams associated with the sidelink communication in a TCI field that identifies a TCI state in the set of TCI states.

The transmission component 1104 may transmit, to the UE, a TCI activation or deactivation MAC-CE that includes an identifier for each of one or more TCI states in the set of TCI states that activates or deactivates one or more respective sidelink transmit beams associated with the respective TCI state and activates or deactivates one or more sidelink transmit beams that the data structure indicates are adjacent to the sidelink transmit beams associated with the one or more TCI states.

The transmission component 1104 may transmit, to the UE, a TCI indication MAC-CE that includes an identifier for a TCI state in the set of TCI states that indicates a sidelink transmit beam associated with the TCI state and one or more sidelink transmit beams that the data structure indicates are adjacent to the sidelink transmit beam.

The transmission component 1104 may transmit, to the UE, a MAC-CE that indicates a quantity of adjacent sidelink transmit beams to be simultaneously activated, deactivated, or indicated.

The transmission component 1104 may transmit, to the UE, a MAC-CE that indicates one or more sets of sidelink transmit beams that are each associated with a respective set of TCI states, wherein the sidelink grant indicates the set of sidelink beams associated with the sidelink communication in a TCI field that identifies a TCI state in the set of TCI states.

The transmission component 1104 may transmit, to the UE, RRC signaling that configures a quantity of adjacent sidelink transmit beams included in a set of simultaneously activated sidelink transmit beams, wherein the set of sidelink beams indicated in the sidelink grant is included in the set of simultaneously activated sidelink transmit beams.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a transmitting UE, comprising: receiving, from a network node, a sidelink grant that indicates a sidelink resource and indicates a set of sidelink beams associated with a sidelink communication using the sidelink resource; selecting, based at least in part on the set of sidelink beams indicated in the sidelink grant, a sidelink beam for the sidelink communication; and transmitting, via the selected sidelink beam, the sidelink communication to one or more receiving UEs using the sidelink resource indicated in the sidelink grant.

Aspect 2: The method of Aspect 1, wherein the set of sidelink beams indicated in the sidelink grant includes multiple sidelink beams that are eligible to be selected as the sidelink beam used to transmit the sidelink communication.

Aspect 3: The method of Aspect 1, wherein the set of sidelink beams indicated in the sidelink grant includes one or more sidelink beams that are ineligible to be selected as the sidelink beam used to transmit the sidelink communication.

Aspect 4: The method of any of Aspects 1-3, wherein a bit in the sidelink grant has a first value that indicates that the set of sidelink beams are eligible to be selected as the sidelink beam used to transmit the sidelink communication or a second value that indicates that the set of sidelink beams are ineligible to be selected as the sidelink beam used to transmit the sidelink communication.

Aspect 5: The method of any of Aspects 1-4, further comprising: receiving, from the network node, RRC signaling that configures, for each TCI state in a set of TCI states, a respective set of sidelink transmit beams associated with the TCI state, wherein the sidelink grant indicates the set of sidelink beams associated with the sidelink communication in a TCI field that identifies a TCI state in the set of TCI states.

Aspect 6: The method of Aspect 5, further comprising: receiving, from the network node, a TCI indication MAC-CE that includes an identifier for a TCI state in the set of TCI states that indicates the respective set of sidelink transmit beams associated with the TCI state.

Aspect 7: The method of Aspect 5, further comprising: receiving, from the network node, a TCI activation or deactivation MAC-CE that includes an identifier for each of one or more TCI states in the set of TCI states that activates or deactivates the respective set of sidelink transmit beams associated with the respective TCI state.

Aspect 8: The method of any of Aspects 1-4, further comprising: receiving, from the network node, RRC signaling that configures a data structure that indicates sidelink beam neighborhood information for each TCI state in a set of TCI states, wherein the sidelink grant indicates the set of sidelink beams associated with the sidelink communication in a TCI field that identifies a TCI state in the set of TCI states.

Aspect 9: The method of Aspect 8, further comprising: receiving, from the network node, a TCI activation or deactivation MAC-CE that includes an identifier for each of one or more TCI states in the set of TCI states that activates or deactivates one or more respective sidelink transmit beams associated with the respective TCI state and activates or deactivates one or more sidelink transmit beams that the data structure indicates are adjacent to the sidelink transmit beams associated with the one or more TCI states.

Aspect 10: The method of Aspect 8, further comprising: receiving, from the network node, a TCI indication MAC-CE that includes an identifier for a TCI state in the set of TCI states that indicates a sidelink transmit beam associated with the TCI state and one or more sidelink transmit beams that the data structure indicates are adjacent to the sidelink transmit beam.

Aspect 11: The method of any of Aspects 8-10, further comprising: receiving, from the network node, a MAC-CE that indicates a quantity of adjacent sidelink transmit beams to be simultaneously activated, deactivated, or indicated.

Aspect 12: The method of any of Aspects 8-10, wherein the sidelink grant indicates a quantity of adjacent sidelink transmit beams to be simultaneously activated, deactivated, or indicated.

Aspect 13: The method of any of Aspects 1-12, further comprising: receiving, from the network node, a MAC-CE that indicates one or more sets of sidelink transmit beams that are each associated with a respective set of TCI states, wherein the sidelink grant indicates the set of sidelink beams associated with the sidelink communication in a TCI field that identifies a TCI state in the set of TCI states.

Aspect 14: The method of any of Aspects 1-13, further comprising: receiving, from the network node, RRC signaling that configures a quantity of adjacent sidelink transmit beams included in a set of simultaneously activated sidelink transmit beams, wherein the set of sidelink beams indicated in the sidelink grant is included in the set of simultaneously activated sidelink transmit beams.

Aspect 15: A method of wireless communication performed by a network node, comprising: determining a sidelink resource and a set of sidelink beams associated with a sidelink communication using the sidelink resource; and transmitting, to a UE, a sidelink grant that indicates the sidelink resource and indicates the set of sidelink beams associated with the sidelink communication, wherein the set of sidelink beams indicated in the sidelink grant controls selection of a sidelink beam used to transmit the sidelink communication.

Aspect 16: The method of Aspect 15, wherein the set of sidelink beams indicated in the sidelink grant includes multiple sidelink beams that are eligible to be selected as the sidelink beam used to transmit the sidelink communication.

Aspect 17: The method of Aspect 15, wherein the set of sidelink beams indicated in the sidelink grant includes one or more sidelink beams that are ineligible to be selected as the sidelink beam used to transmit the sidelink communication.

Aspect 18: The method of any of Aspects 15-17, wherein a bit in the sidelink grant has a first value that indicates that the set of sidelink beams are eligible to be selected as the sidelink beam used to transmit the sidelink communication or a second value that indicates that the set of sidelink beams are ineligible to be selected as the sidelink beam used to transmit the sidelink communication.

Aspect 19: The method of any of Aspects 15-18, further comprising: transmitting, to the UE, RRC signaling that configures, for each TCI state in a set of TCI states, a respective set of sidelink transmit beams associated with the TCI state, wherein the sidelink grant indicates the set of sidelink beams associated with the sidelink communication in a TCI field that identifies a TCI state in the set of TCI states.

Aspect 20: The method of Aspect 19, further comprising: transmitting, to the UE, a TCI indication MAC-CE that includes an identifier for a TCI state in the set of TCI states that indicates the respective set of sidelink transmit beams associated with the TCI state.

Aspect 21: The method of Aspect 19, further comprising: transmitting, to the UE, a TCI activation or deactivation MAC-CE that includes an identifier for each of one or more TCI states in the set of TCI states that activates or deactivates the respective set of sidelink transmit beams associated with the respective TCI state.

Aspect 22: The method of any of Aspects 15-18, further comprising: transmitting, to the UE, RRC signaling that configures a data structure that indicates sidelink beam neighborhood information for each TCI state in a set of TCI states, wherein the sidelink grant indicates the set of sidelink beams associated with the sidelink communication in a TCI field that identifies a TCI state in the set of TCI states.

Aspect 23: The method of Aspect 22, further comprising: transmitting, to the UE, a TCI activation or deactivation MAC-CE that includes an identifier for each of one or more TCI states in the set of TCI states that activates or deactivates one or more respective sidelink transmit beams associated with the respective TCI state and activates or deactivates one or more sidelink transmit beams that the data structure indicates are adjacent to the sidelink transmit beams associated with the one or more TCI states.

Aspect 24: The method of Aspect 22, further comprising: transmitting, to the UE, a TCI indication MAC-CE that includes an identifier for a TCI state in the set of TCI states that indicates a sidelink transmit beam associated with the TCI state and one or more sidelink transmit beams that the data structure indicates are adjacent to the sidelink transmit beam.

Aspect 25: The method of any of Aspects 22-24, further comprising: transmitting, to the UE, a MAC-CE that indicates a quantity of adjacent sidelink transmit beams to be simultaneously activated, deactivated, or indicated.

Aspect 26: The method of any of Aspects 22-24, wherein the sidelink grant indicates a quantity of adjacent sidelink transmit beams to be simultaneously activated, deactivated, or indicated.

Aspect 27: The method of any of Aspects 15-26, further comprising: transmitting, to the UE, a MAC-CE that indicates one or more sets of sidelink transmit beams that are each associated with a respective set of TCI states, wherein the sidelink grant indicates the set of sidelink beams associated with the sidelink communication in a TCI field that identifies a TCI state in the set of TCI states.

Aspect 28: The method of any of Aspects 15-27, further comprising: transmitting, to the UE, RRC signaling that configures a quantity of adjacent sidelink transmit beams included in a set of simultaneously activated sidelink transmit beams, wherein the set of sidelink beams indicated in the sidelink grant is included in the set of simultaneously activated sidelink transmit beams.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A transmitting user equipment (UE) for wireless communication, comprising:
   at least one memory; and
   at least one processor communicatively coupled with the memory, the at least one processor configured to cause the transmitting UE to:
      receive, from a network node, radio resource control (RRC) signaling that configures a data structure that indicates sidelink beam neighborhood information for each transmission configuration indication (TCI) state in a set of TCI states;
      receive, from the network node, a sidelink grant that indicates one or more of a time resource or a frequency resource to use for a sidelink communication and indicates a set of sidelink beams associated with the sidelink communication in a TCI field that identifies a TCI state in the set of TCI states;
      select, based at least in part on the set of sidelink beams indicated in the sidelink grant, a sidelink beam for the sidelink communication; and
      transmit, via the selected sidelink beam, the sidelink communication to one or more receiving UEs using the one or more of the time resource or the frequency resource indicated in the sidelink grant.

2. The transmitting UE of claim 1, wherein the set of sidelink beams indicated in the sidelink grant includes multiple sidelink beams that are eligible to be selected as the sidelink beam used to transmit the sidelink communication.

3. The transmitting UE of claim 1, wherein the set of sidelink beams indicated in the sidelink grant includes one or more sidelink beams that are ineligible to be selected as the sidelink beam used to transmit the sidelink communication.

4. The transmitting UE of claim 1, wherein a bit in the sidelink grant has a first value that indicates that the set of sidelink beams are eligible to be selected as the sidelink beam used to transmit the sidelink communication or a second value that indicates that the set of sidelink beams are ineligible to be selected as the sidelink beam used to transmit the sidelink communication.

5. The transmitting UE of claim 1, wherein the RRC signaling configures, for each TCI state in the set of TCI states, a respective set of sidelink transmit beams.

6. The transmitting UE of claim 5, wherein the at least one processor is further configured to cause the transmitting UE to:
   receive, from the network node, a TCI activation or deactivation medium access control control element (MAC-CE) that includes an identifier for each of one or more TCI states in the set of TCI states that activates or deactivates the respective set of sidelink transmit beams.

7. The transmitting UE of claim 1, wherein the at least one processor is further configured to cause the transmitting UE to:
receive, from the network node, a TCI indication medium access control control element (MAC-CE) that includes an identifier for the TCI state.

8. The transmitting UE of claim 1, wherein the at least one processor is further configured to cause the transmitting UE to:
receive, from the network node, a TCI activation or deactivation medium access control control element (MAC-CE) that includes an identifier for each of one or more TCI states in the set of TCI states that activates or deactivates one or more respective sidelink transmit beams associated with a respective TCI state and activates or deactivates one or more sidelink transmit beams that the data structure indicates are adjacent to sidelink transmit beams associated with the one or more TCI states.

9. The transmitting UE of claim 1, wherein the at least one processor is further configured to cause the transmitting UE to:
receive, from the network node, a TCI indication medium access control control element (MAC-CE) that includes an identifier for the TCI state and one or more sidelink transmit beams that the data structure indicates are adjacent to a sidelink transmit beam associated with the TCI state.

10. The transmitting UE of claim 1, wherein the at least one processor is further configured to cause the transmitting UE to:
receive, from the network node, a medium access control control element (MAC-CE) that indicates a quantity of adjacent sidelink transmit beams to be simultaneously activated, deactivated, or indicated.

11. The transmitting UE of claim 1, wherein the sidelink grant indicates a quantity of adjacent sidelink transmit beams to be simultaneously activated, deactivated, or indicated.

12. The transmitting UE of claim 1, wherein the at least one processor is further configured to cause the transmitting UE to:
receive, from the network node, a medium access control control element (MAC-CE) that indicates one or more sets of sidelink transmit beams that are each associated with a respective set of TCI states.

13. The transmitting UE of claim 1, wherein the RRC signaling configures a quantity of adjacent sidelink transmit beams included in a set of simultaneously activated sidelink transmit beams, wherein the set of sidelink beams indicated in the sidelink grant is included in the set of simultaneously activated sidelink transmit beams.

14. A network node for wireless communication, comprising:
at least one memory; and
at least one processor communicatively coupled with the memory, the at least one processor configured to cause the network node to:
transmit, to a user equipment (UE), radio resource control (RRC) signaling that configures a data structure that indicates sidelink beam neighborhood information for each transmission configuration indication (TCI) state in a set of TCI states;
determine a sidelink resource and a set of sidelink beams associated with a sidelink communication using the sidelink resource, wherein the sidelink resource includes one or more of a time resource or a frequency resource; and
transmit, to the UE, a sidelink grant that indicates the sidelink resource and indicates the set of sidelink beams associated with the sidelink communication in a TCI field that identifies a TCI state in the set of TCI states, wherein the set of sidelink beams indicated in the sidelink grant controls selection of a sidelink beam used to transmit the sidelink communication.

15. The network node of claim 14, wherein the at least one processor is further configured to cause the network node to:
transmit a TCI indication medium access control control element (MAC-CE) that includes an identifier for the TCI state.

16. A method of wireless communication performed by a transmitting user equipment (UE), comprising:
receiving, from a network node, radio resource control (RRC) signaling that configures a data structure that indicates sidelink beam neighborhood information for each transmission configuration indication (TCI) state in a set of TCI states;
receiving, from the network node, a sidelink grant that indicates one or more of a time resource or a frequency resource to use for a sidelink communication and indicates a set of sidelink beams associated with the sidelink communication in a TCI field that identifies a TCI state in the set of TCI states;
selecting, based at least in part on the set of sidelink beams indicated in the sidelink grant, a sidelink beam for the sidelink communication; and
transmitting, via the selected sidelink beam, the sidelink communication to one or more receiving UEs using the one or more of the time resource or the frequency resource indicated in the sidelink grant.

17. The method of claim 16, wherein the set of sidelink beams indicated in the sidelink grant includes multiple sidelink beams that are eligible to be selected as the sidelink beam used to transmit the sidelink communication.

18. The method of claim 16, wherein the set of sidelink beams indicated in the sidelink grant includes one or more sidelink beams that are ineligible to be selected as the sidelink beam used to transmit the sidelink communication.

19. The method of claim 16, wherein a bit in the sidelink grant has a first value that indicates that the set of sidelink beams are eligible to be selected as the sidelink beam used to transmit the sidelink communication or a second value that indicates that the set of sidelink beams are ineligible to be selected as the sidelink beam used to transmit the sidelink communication.

20. The method of claim 16, wherein the RRC signaling configures, for each TCI state in the set of TCI states, a respective set of sidelink transmit beams.

21. The method of claim 20, further comprising:
receiving, from the network node, a TCI activation or deactivation medium access control control element (MAC-CE) that includes an identifier for each of one or more TCI states in the set of TCI states that activates or deactivates the respective set of sidelink transmit beams.

22. The method of claim 16, further comprising:
receiving, from the network node, a TCI indication medium access control control element (MAC-CE) that includes an identifier for the TCI state.

23. The method of claim 16, further comprising:
receiving, from the network node, a TCI activation or deactivation medium access control control element (MAC-CE) that includes an identifier for each of one or more TCI states in the set of TCI states that activates or deactivates one or more respective sidelink transmit beams associated with a respective TCI state and activates or deactivates one or more sidelink transmit beams that the data structure indicates are adjacent to sidelink transmit beams associated with the one or more TCI states.

24. The method of claim 16, further comprising:
receiving, from the network node, a TCI indication medium access control control element (MAC-CE) that includes an identifier for the TCI state and one or more sidelink transmit beams that the data structure indicates are adjacent to a sidelink transmit beam associated with the TCI state.

25. The method of claim 16, further comprising:
receiving, from the network node, a medium access control control element (MAC-CE) that indicates a quantity of adjacent sidelink transmit beams to be simultaneously activated, deactivated, or indicated.

26. The method of claim 16, wherein the sidelink grant indicates a quantity of adjacent sidelink transmit beams to be simultaneously activated, deactivated, or indicated.

27. The method of claim 16, further comprising:
receiving, from the network node, a medium access control control element (MAC-CE) that indicates one or more sets of sidelink transmit beams that are each associated with a respective set of TCI states.

28. The method of claim 16, where the RRC signaling configures a quantity of adjacent sidelink transmit beams included in a set of simultaneously activated sidelink transmit beams, wherein the set of sidelink beams indicated in the sidelink grant is included in the set of simultaneously activated sidelink transmit beams.

29. A method of wireless communication performed by a network node, comprising:
transmitting, to a user equipment (UE), radio resource control (RRC) signaling that configures a data structure that indicates sidelink beam neighborhood information for each transmission configuration indication (TCI) state in a set of TCI states;
determining a sidelink resource and a set of sidelink beams associated with a sidelink communication using the sidelink resource, wherein the sidelink resource includes one or more of a time resource or a frequency resource; and
transmitting, to the UE, a sidelink grant that indicates the sidelink resource and indicates the set of sidelink beams associated with the sidelink communication in a TCI field that identifies a TCI state in the set of TCI states, wherein the set of sidelink beams indicated in the sidelink grant controls selection of a sidelink beam used to transmit the sidelink communication.

30. The method of claim 29, further comprising:
transmitting a TCI indication medium access control control element (MAC-CE) that includes an identifier for the TCI state.

* * * * *